United States Patent
Yamashita et al.

(10) Patent No.: US 11,061,839 B2
(45) Date of Patent: Jul. 13, 2021

(54) INPUT/OUTPUT CONTROL UNIT, PROGRAMMABLE LOGIC CONTROLLER, AND INSPECTION SYSTEM

(71) Applicant: Mitsubishi Electric Corporation, Tokyo (JP)

(72) Inventors: Kohei Yamashita, Tokyo (JP); Satoru Ukena, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/959,737

(22) PCT Filed: Feb. 7, 2018

(86) PCT No.: PCT/JP2018/004268
§ 371 (c)(1),
(2) Date: Jul. 2, 2020

(87) PCT Pub. No.: WO2019/155560
PCT Pub. Date: Aug. 15, 2019

(65) Prior Publication Data
US 2020/0371975 A1  Nov. 26, 2020

(51) Int. Cl.
*G06F 13/20* (2006.01)
*G01B 11/06* (2006.01)
(Continued)

(52) U.S. Cl.
CPC .............. *G06F 13/20* (2013.01); *G01B 11/06* (2013.01); *G01B 11/26* (2013.01); *G01D 5/36* (2013.01)

(58) Field of Classification Search
CPC ....................................................... G06F 13/20
(Continued)

(56) References Cited

U.S. PATENT DOCUMENTS 3,987,289 A * 10/1976 Bredenkamp ............. G06F 7/62
702/86
4,366,427 A * 12/1982 Walker .................... H02P 23/07
318/762
(Continued)

FOREIGN PATENT DOCUMENTS

CN        1804742 A    7/2006
CN      101660896 A    3/2010
(Continued)

OTHER PUBLICATIONS

Office Action dated Oct. 7, 2020, in corresponding Korean Application No. 10-2020-7022301, 10 pages.
(Continued)

*Primary Examiner* — Tarifur R Chowdhury
*Assistant Examiner* — Omar H Nixon
(74) *Attorney, Agent, or Firm* — Xsensus LLP

(57) ABSTRACT

An input/output control unit (120) includes a storage, an input/output controller (126), an analog signal input interface (129), and a pulse signal input interface (127A). The input/output controller (126) includes a pulse signal input block (1411) to generate a trigger signal, an A/D conversion block (1431) to generate wafer thickness information by analog-to-digital conversion of an analog signal, a logger block (1501) to, in synchronization with the trigger signal, store the wafer thickness information a preset table A in the storage, a counter block (1461) to continuously generate, from the digital signal, count value information indicating a count value and output the generated information, and a logger block (1502) to, in synchronization with the trigger information, store the count value information, in association with the wafer thickness information, in a table TB in the storage (124).

16 Claims, 17 Drawing Sheets

(51) Int. Cl.
    *G01B 11/26*     (2006.01)
    *G01D 5/36*      (2006.01)
(58) Field of Classification Search
    USPC ........................................................ 710/365
    See application file for complete search history.

(56) References Cited

U.S. PATENT DOCUMENTS

| | | | |
|---|---|---|---|
| 9,869,979 | B2 | 1/2018 | Shimamura et al. |
| 2010/0254201 | A1 | 10/2010 | Asauchi |
| 2014/0075052 | A1* | 3/2014 | Kris .................... G06F 15/7814 |
| | | | 710/5 |
| 2016/0147682 | A1 | 5/2016 | Ikuyama et al. |
| 2017/0322607 | A1 | 11/2017 | Kawana |
| 2018/0011467 | A1 | 1/2018 | Murayama |
| 2018/0101159 | A1 | 4/2018 | Nagatomo et al. |
| 2018/0329388 | A1 | 11/2018 | Okuyama et al. |
| 2019/0056705 | A1 | 2/2019 | Ukena et al. |

FOREIGN PATENT DOCUMENTS

| | | |
|---|---|---|
| CN | 101898454 A | 12/2010 |
| CN | 204086920 U | 1/2015 |
| CN | 206074742 U | 4/2017 |
| CN | 107615189 A | 1/2018 |
| JP | 2010-176545 A | 8/2010 |
| TW | I585556 B | 6/2017 |
| WO | 2007/106085 A1 | 9/2007 |
| WO | 2014/207825 A1 | 12/2014 |
| WO | 2016/121038 A1 | 8/2016 |
| WO | 2017/077628 A1 | 5/2017 |

OTHER PUBLICATIONS

International Search Report and Written Opinion dated May 1, 2018 for PCT/JP2018/004268 filed on Feb. 7, 2018, 6 pages including English Translation of the International Search Report.
Notification of Reasons for Refusal received for Japanese Patent Application No. 2018-568984, dated Mar. 19, 2019, 5 pages including English Translation.
Notification of Reasons for Refusal received for Japanese Patent Application No. 2018-568984, dated Jul. 16, 2019, 5 pages including English Translation.
Decision to Grant a Patent received for Japanese Patent Application No. 2018-568984, dated Sep. 3, 2019, 5 pages including English Translation.
Office Action received for Taiwanese Patent Application No. 108103865, dated Jun. 27, 2019, 7 pages (with partial translation).
Office Action dated Mar. 19, 2021, in corresponding Chinese patent Application No. 201880088387.7, 25 pages.

* cited by examiner

FIG.7

| ANGLE OF ROTATION | WAFER THICKNESS UPPER REFERENCE VALUE (AU) | WAFER THICKNESS LOWER REFERENCE VALUE (AL) |
|---|---|---|
| B0 | 20 | 10 |
| B1 | 20 | 10 |
| B2 | 20 | 10 |
| B3 | 31 | 19 |
| B4 | 42 | 28 |
| B5 | 54 | 36 |
| B6 | 42 | 28 |
| B7 | 31 | 19 |
| B8 | 20 | 10 |
| B9 | 20 | 10 |
| ⋮ | ⋮ | ⋮ |
| BN | 20 | 10 |

DAJ

INPUT/OUTPUT CONTROL UNIT, PROGRAMMABLE LOGIC CONTROLLER, AND INSPECTION SYSTEM

CROSS-REFERENCE TO RELATED APPLICATIONS

The present application is based on PCT filing PCT/JP2018/004268, filed Feb. 7, 2018, the entire contents of which are incorporated herein by reference.

TECHNICAL FIELD

The present disclosure relates to an input/output control unit, a programmable logic controller, and an inspection system.

BACKGROUND ART

A programmable controller has been proposed that includes a synchronizing control signal generating unit that generates a synchronizing control signal based on a pulse signal from an encoder, a counter unit, an analog input unit, and a central processing unit (CPU) unit (see, for example, Patent Literature 1). Here, the counter unit latches in an internal memory a count value of pulses of a pulse signal coming from the encoder, at a timing synchronous with the synchronizing control signal. The analog input unit latches in the internal memory a value indicating a signal level of an analog signal output by a sensor, at a timing synchronous with the synchronizing control signal. The CPU unit, in synchronization with the synchronizing control signal, reads those values via a bus communication line, that is, reads the count value latched in the internal memory of the counter unit and the value indicating the signal level of the analog signal latched in the internal memory of the analog input unit.

CITATION LIST

Patent Literature

Patent Literature 1: International Publication No. WO 2014/207825

SUMMARY OF INVENTION

Technical Problem

In the programmable controller described in Patent Literature 1, the CPU unit reads, in every period of the synchronizing control signal, the count value and the value indicating the signal level of the analog signal, each of which values is latched in the corresponding internal memory. Thus the period of the synchronizing control signal is required to be longer than a time period for the CPU unit to read the count value and the value indicating the signal level of the analog signal. That is, the period of the synchronizing control signal is constrained by the processing speed of the CPU unit. Thus this constraint inevitably leads to a longer processing time of the programmable logic controller, and reduction in tact time has been difficult to achieve in a production device using such a controller. In the programmable controller described in Patent Literature 1, a plurality of storage areas is provided neither in an internal memory of the counter unit nor in an internal memory of the analog input unit. Thus the CPU unit is required to read, as necessary from each internal memory, data stored in a single storage area of each of the internal memories of the counter unit and the analog input unit before the data is overwritten with data newly transferred to the storage area. This increases the processing time of the programmable logic controller.

In view of the above circumstances, an objective of the present disclosure is to provide an input/output control unit, a programmable logic controller, and an inspection system capable of improving the processing speed of the programmable logic controller.

Solution to Problem

To achieve the above objective, an input/output control unit according to the present disclosure includes a storage, an input/output controller, a first input interface, and a second input interface. The first input interface is configured to be connected to a first device and outputs to the input/output controller a first signal input by the first device The second input interface is configured to be connected to a second device and outputs to the input/output controller a second signal input by the second device. The input/output controller includes a trigger outputter to generate a trigger signal, a first longer block, and a second logger block. The first logger block, in synchronization with the trigger signal, stores first information in preset first storage areas in the storage. The first information is based on the first signal. The second logger block, in synchronization with the trigger signal, stores second information in preset second storage areas in the storage in association with the first information. The second information is based on the second signal.

Advantageous Effects of Invention

According to the present disclosure, the input/output controller includes the first logger block that, in synchronization with the trigger signal, stores in the first storage areas the first information based on the first signal, and the second logger block that, in synchronization with the trigger signal, stores in the second storage areas the second information based on the second signal. Thus, for example, the CPU unit does not need to perform reading processing of reading, as required, the first information or the second information stored in a single storage area before the first information or the second information is overwritten by first information and second information newly transferred to the single storage area. In addition, the input/output control unit can store in the storage the simultaneously obtained digital information and count information in association with each other. Accordingly, for example, since a period of the trigger signal can be shortened regardless of the processing speed of the CPU unit, the digital information and the count information can be obtained simultaneously in a short time interval, and the processing speed of a programmable logic controller including the input/output control unit according to the present disclosure can be improved.

BRIEF DESCRIPTION OF DRAWINGS

FIG. 7 is a diagram illustrating an example of determination criterion information according to the embodiment;

DESCRIPTION OF EMBODIMENTS

A programmable logic controller according to an embodiment of the present disclosure is described with reference to the drawings. An input/output control unit of the programmable logic controller according to the present embodiment includes an input/output controller having general-purpose circuit blocks, a first input interface to output to the input/output controller a first signal received from an exterior, and a second input interface to output to the input/output controller a second signal received from the exterior. In the present embodiment, the first signal is an analog signal and the second signal is a pulse signal. The first input interface is an analog signal input interface and the second input interface is a pulse signal input interface. The input/output control unit further includes mass storage. The input/output controller simultaneously generates multiple kinds of information, that is, first information based on the first signal and second information based on the second signal, by executing parallel processing on the first signal and the second signal simultaneously received. Then the input/output controller stores in a storage the multiple kinds of information sequentially every time the multiple kinds of information are generated. Here, the storage has first storage areas for storing pieces of first information and second storage areas for storing pieces of second information. The storage manages the pieces of first information and the pieces of second information with common relative addresses and stores those pieces of first and second information in association with one another. The input/output control unit includes a determiner that makes a determination about pieces of the various types of information stored in the storage, based on preset determination information.

Figure 1:
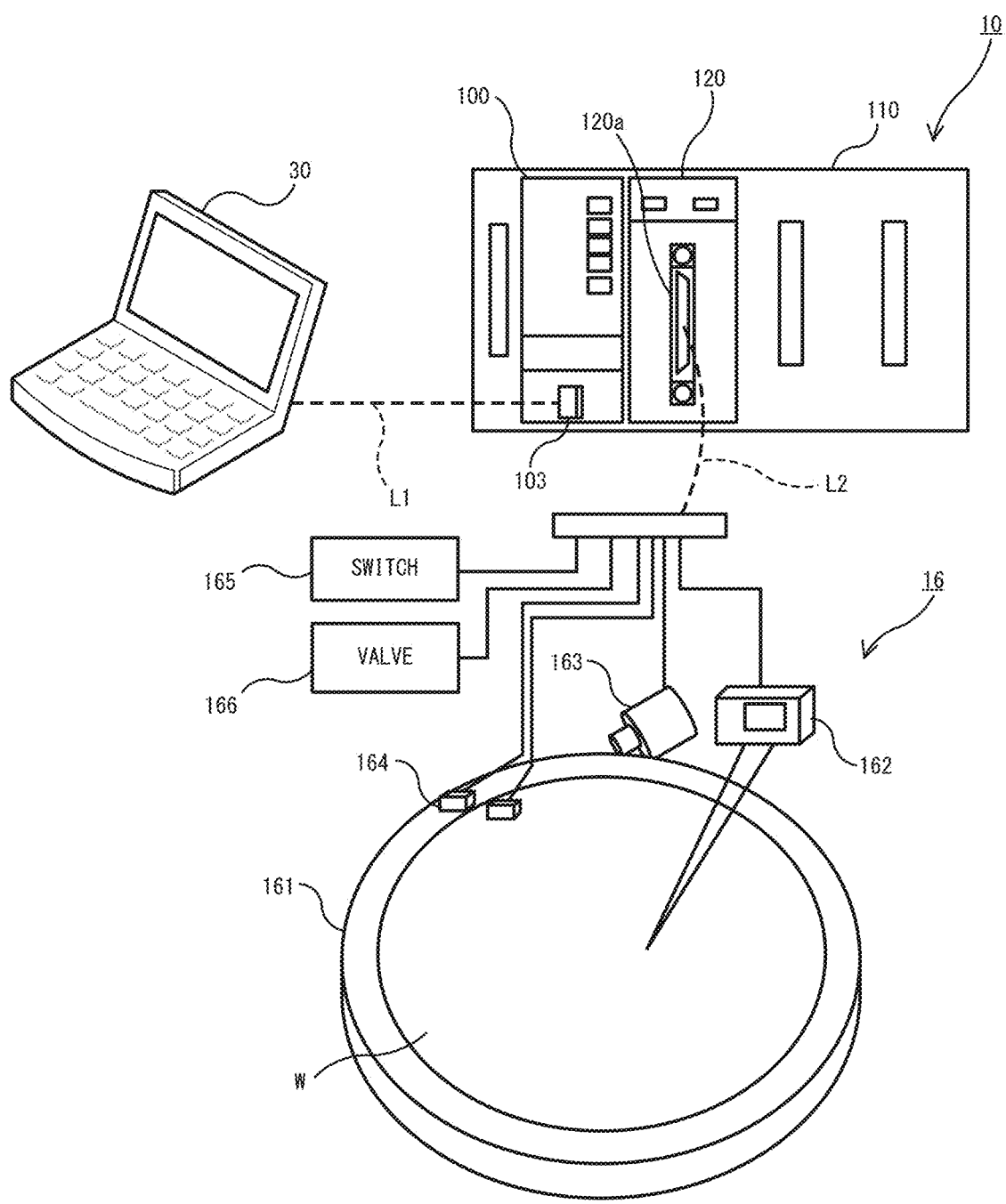
FIG. 1 is a drawing illustrating a wafer thickness inspection system according to an embodiment of the present disclosure.

For example, as illustrated in FIG. 1, a programmable logic controller (hereinafter referred to as "PLC") 10 according to the present embodiment constitutes a wafer thickness inspection system, together with a wafer thickness inspection unit 16.

The wafer thickness inspection unit 16 includes a turntable 161, a laser displacement sensor 162, an encoder 163, and a proximity sensor 164. Here, the laser displacement sensor 162 corresponds to a first device recited in the claims, the encoder 163 corresponds to a second device recited in the claims, and the proximity sensor 164 corresponds to a third device recited in the claims. The wafer thickness inspection unit 16 includes a switch 165 for switching on and off a rotary operation of the turntable 161, and a valve 166 for changing a suction state of a vacuum chuck (not illustrated) provided on the turntable 161. The turntable 161, the laser displacement sensor 162, the encoder 163, the proximity sensor 164, the switch 165, and the valve 166 are connected to an input/output interface 120a of the PLC 10 via a communication line L2. This wafer thickness inspection system measures a thickness of a wafer W by the laser displacement sensor 162 while rotating the wafer W disposed on the turntable 161 of the wafer thickness inspection unit 16.

Figure 2:
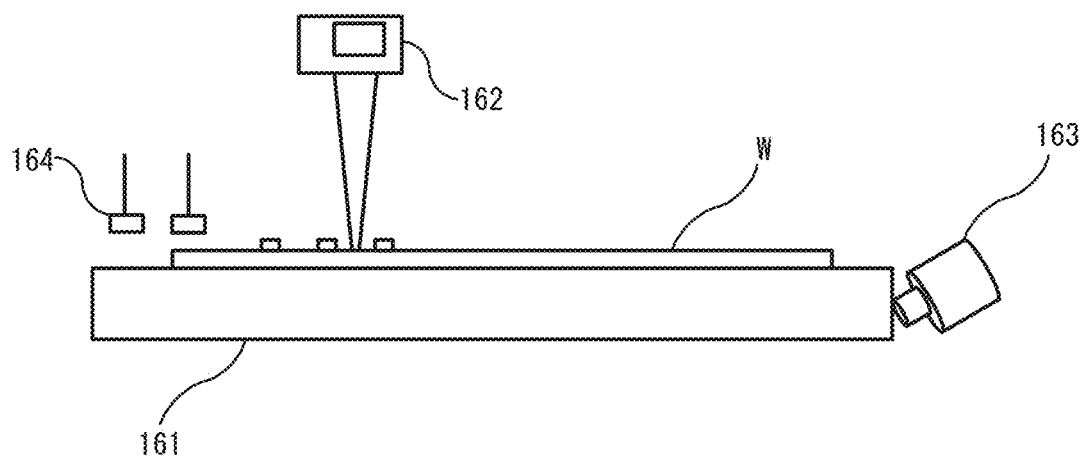
FIG. 2 is a drawing illustrating a portion of the wafer thickness inspection system according to the embodiment.

As illustrated in FIG. 2, the laser displacement sensor 162 is disposed above the turntable 161 and outputs a current signal that is an analog signal. This current signal is, for example, a signal indicating an electrical current value that reflects a thickness of the wafer W. The encoder 163 is, for example, a photoelectric rotary encoder, and is provided at a peripheral portion of the turntable 161 having a disc-like shape. The encoder 163 has, for example, a slit disc that rotates with rotation of the turntable 161, and a phototransistor. The encoder 163 receives, at the phototransistor, light passing through slits of the slit disc with the rotation of the turntable 161 and outputs a pulse signal in accordance with the received light. The encoder 163 outputs pulse signals successively with rotation of the turntable 161. This pulse signal is a signal having a frequency of pulse occurrence that increases or decreases with a rotation speed of the turntable. A count value obtained by counting pulses included in the pulse signal output by the encoder 163 increases in proportion to a rotation angle of the turntable 161 from an initial position thereof, that is, increases in proportion to an angle of rotation of the wafer W. The proximity sensor 164 is a sensor that detects an approach of the wafer W, and is provided, for example, above the peripheral portion of the turntable 161. The proximity sensor 164 outputs a pulse signal when a distance between the wafer and the proximity sensor 164 is equal to or less than a preset distance.

Figure 3:
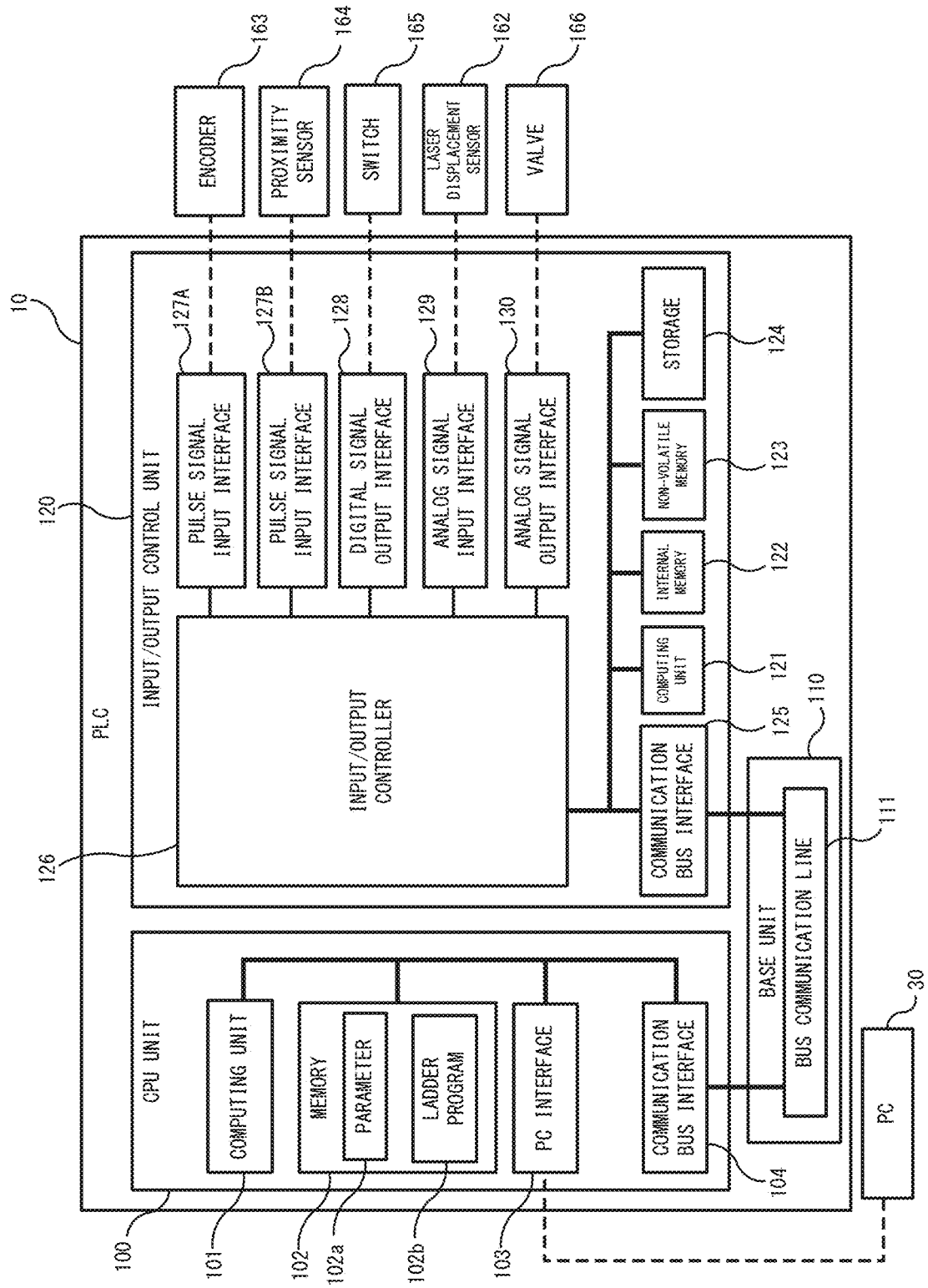
FIG. 3 is a block diagram illustrating a configuration of the programmable logic controller according to the embodiment.

With reference back to FIG. 1, the PLC 10 includes a base unit 110, a central processing unit (CPU) 100, and an input/output control unit 120. The CPU unit 100 is provided with a PC interface 103 that is a USB interface. The input/output control unit 120 is provided with the input/output interface 120a connected via the communication line L2 to the wafer thickness inspection unit 16. As illustrated in FIG. 3, the base unit 110 includes, for example, a bus communication line 111 for reception and transmission of information between the CPU unit 100 and the input/output control unit 120. The base unit 110 has a plate surface portion disposed on backsides of the CPU unit 100 and the input/output control unit 120. The base unit 110 is connected at the plate surface portion via a connector (not illustrated) to the CPU unit 100 and the input/output control unit 120.

The CPU unit 100 includes a memory 102 that stores a preset parameter 102a and a ladder program 102b, and a computing unit 101 that executes the ladder program 102b based on the parameter 102a. The computing unit 101 has a CPU and a random access memory (RAM) that is a work area for the CPU. The memory 102 is, for example, a non-volatile memory, such as a magnetic disc or a semiconductor flash memory. The CPU unit 100 includes the PC interface 103 that is, for example, a universal serial bus (USB) interface, and a communication bus interface 104 for communication via the bus communication line 111.

The input/output control unit 120 includes a computing unit 121, an internal memory 122, a non-volatile memory 123, a storage 124, and an input/output controller 126 that is a reconfigurable integrated circuit having general-purpose circuit blocks. Examples of the non-volatile memory 123 and the storage 124 include a magnetic disc and a semiconductor flash memory. The input/output control unit 120 includes a communication bus interface 125 for communication via the bus communication line 111. The input/output control unit 120 further includes pulse signal input interfaces 127A and 127B, a digital signal output interface 128, an analog signal input interface 129, and an analog signal output interface 130.

The pulse signal input interface 127A is a second input interface that outputs to the input/output controller 126 a pulse signal that is the second signal received from the encoder 163. The pulse signal input interface 127B is a third input interface that outputs to the input/output controller 126 a pulse signal that is the third signal received from the proximity sensor 164. The digital signal output interface 128 outputs to the switch 165 a digital signal received from the input/output controller 126. The analog signal input interface 129 outputs to the input/output controller 126 an analog signal received from the laser displacement sensor 162. The analog signal output interface 130 outputs to the valve 166 an analog signal received from the input/output controller 126, thereby causing driving of the valve 166.

Figure 4:
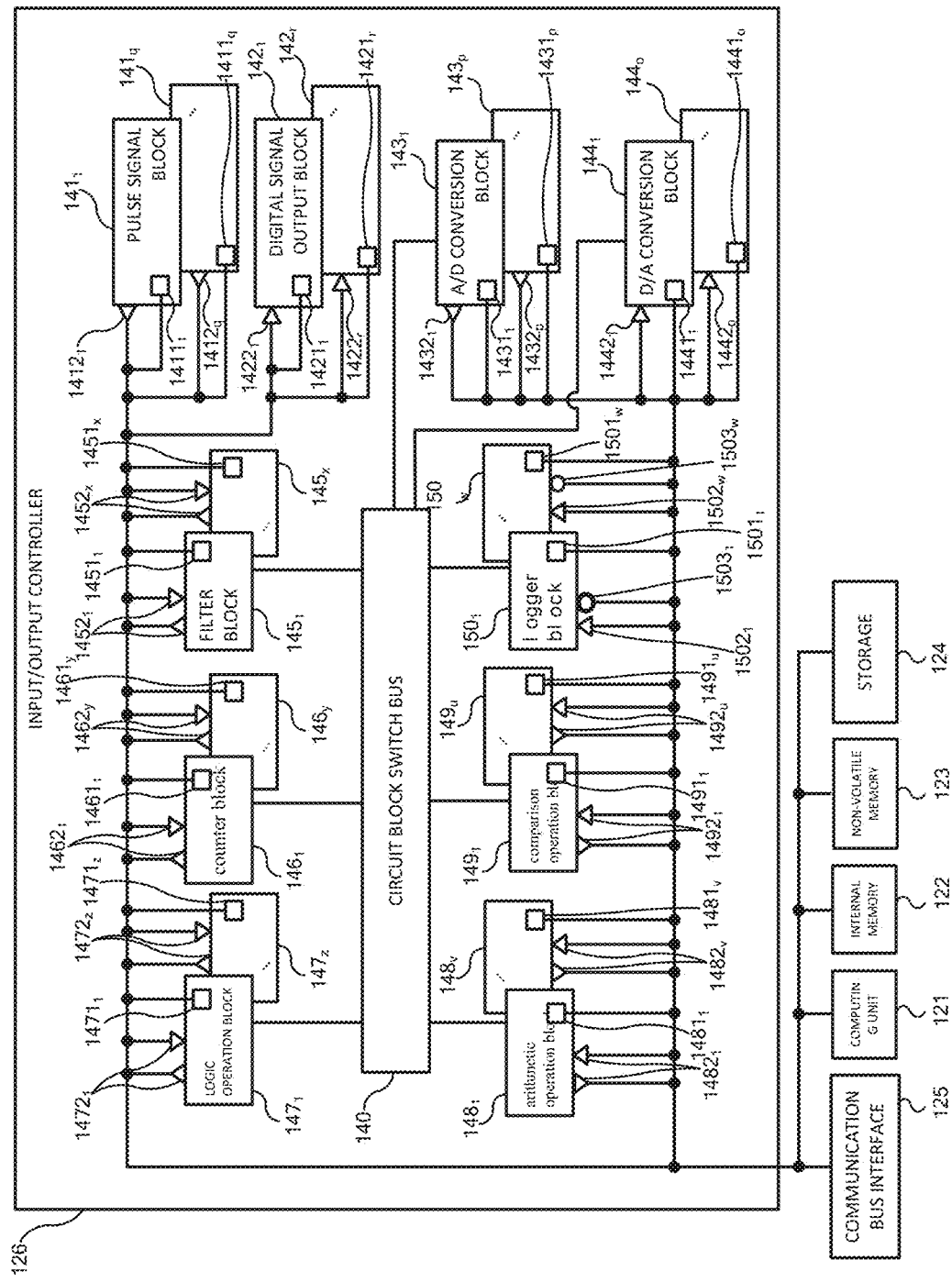
FIG. 4 is a block diagram illustrating a configuration of an input/output controller according to the embodiment.

As illustrated in FIG. 4, the input/output controller 126 has filter blocks $145_1$ to $145_x$, counter blocks $146_1$ to $146_y$, logical operation blocks $147_1$ to $147_z$, arithmetic operation blocks $148_1$ to $148_v$, comparison operation blocks $149_1$ to $149_u$, and logger blocks $150_1$ to $150_w$. The input/output controller 126 also has pulse signal input blocks $141_1$ to $141_q$, digital signal output blocks $142_1$ to $142_r$, A/D conversion blocks $143_1$ to $143_p$, D/A conversion blocks $144_1$ to $144_o$, and a circuit block switching bus 140. These various kinds of blocks are hereinafter referred to as general-purpose circuit blocks as appropriate. These general-purpose circuit blocks are capable of high-speed operation on the order of nanoseconds by executing parallel processing. The circuit block switching bus 140 has functions for changing combinations or order of use of the general-purpose circuit blocks. The general-purpose circuit blocks operate based on execution parameters stored in their corresponding registers. The input/output controller 126 has a clock outputter (not illustrated) that outputs an internal control clock having a period of nanoseconds.

The pulse signal input blocks $141_1$ to $141_q$ have registers $1411_1$ to $1411_q$ that store execution parameters and input/output terminals $1412_1$ to $1412_q$ that input and output information. Among these blocks, the pulse signal input blocks $141_1$ and $141_2$, upon input of pulse signals from their corresponding pulse signal input interfaces 127A and 127B, output digital information corresponding to the pulse signals via the input/output terminals $1412_1$ and $1412_2$ to their corresponding general-purpose circuit blocks.

The digital signal output blocks $142_1$ to $142_r$ have registers $1421_1$ to $142_r$ that store execution parameters and input/output terminals $1422_1$ to $1422_r$ that input and output information. Among these blocks, the digital signal output block $142_1$, for example, upon input of digital information via the input/output terminal $1422_1$ from a computing unit 121, outputs the digital signals corresponding to the digital information to the digital signal output interface 128.

The A/D conversion blocks $143_1$ to $143_p$ have registers $1431_1$ to $143_1$, that store execution parameters and input/output terminals $1432_1$ to $1432_p$ that input and output information. The A/D conversion blocks $143_1$ to $143_p$ continuously convert analog signals input through the analog signal input interface 129 into digital values corresponding to the signal levels of the analog signals, and outputs the digital information. That is, the A/D conversion blocks $143_1$ to $143_p$ are digital information generation blocks that generate digital information indicating digital values that correspond to signal levels of analog signals by analog-to-digital conversion of analog signals. Then the A/D conversion blocks $143_1$ to $143_p$ output the digital information obtained by conversion via input/output terminals $1432_1$ to $1432_p$ to their corresponding general-purpose circuit blocks.

The D/A conversion blocks $144_1$ to $144_o$ have registers $1441_1$ to $1441_o$ that store execution parameters and input/output terminals $1442_1$ to $1442_o$ that input and output information. The D/A conversion blocks $144_1$ to $144_o$ convert digital information input, for example, via the input/output terminals $1442_1$ to $1442_o$ from the computing unit 121 and indicating a signal level and a polarity of an analog signal, into an analog signal corresponding to the signal level and the polarity. The D/A conversion blocks $144_1$ to $144_o$ output the analog signal obtained by conversion to the analog signal output interface 130.

The filter blocks $145_1$ to $145_x$ have registers $1451_1$ to $1451_x$ that store execution parameters and input/output terminals $1452_1$ to $1452_x$ that input and output information. The filter blocks $145_1$ to $145_x$ filter out noise included in signals input to the input/output controller 126.

The counter blocks $146_1$ to $146_y$ have registers $1461_1$ to $1461_y$ that store execution parameters and input/output terminals $1462_1$ to $1462_y$ that input and output information. For example, upon input of digital information corresponding to pulse signals via the input/output terminals $1462_1$ to $1462_y$ from the pulse signal input blocks $141_1$ to $141_q$, the counter blocks $146_1$ to $146_y$ count pulses included in pulse signals based on the digital information. The counter blocks $146_1$ to $146_y$ generate count information indicating count values obtained by continuously counting pulses included in the pulse signals, and outputs the generated count information.

The logical operation blocks $147_1$ to $147_z$ have registers $1471_1$ to $147_z$ that store execution parameters and input/output terminals $1472_1$ to $1472_z$ that input and output information. The logical operation blocks $147_1$ to $147_z$ execute basic logical operations on bit data Examples of the basic logical operations include logical negation, logical product (AND), logical sum (OR), exclusive logical sum (XOR), negative logical sum (NOR), and negative logical product (NAND).

The arithmetic operation blocks $148_1$ to $148_v$ have registers $1481_1$ to $1481_v$ that store execution parameters and input/output terminals $1482_1$ to $1482_v$ that input and output information. The arithmetic operation blocks $148_1$ to $148_v$ execute arithmetic operations, such as addition, subtraction, multiplication, and division, on word data.

The comparison operation blocks $149_1$ to $149_u$ have registers $149_1$ to $1491_u$ that store execution parameters and input/output terminals $1492_1$ to $1492_u$ that input and output information. The comparison operation blocks $149_1$ to $149_u$ execute comparison processing.

The logger blocks $150_1$ to $150_w$ have registers $1501_1$ to $1501_w$ that store execution parameters and input/output terminals $1502_1$ to $1502_w$ that input and output information. The logger blocks $150_1$ to $150_w$ have trigger input terminals $1503_1$ to $1503_w$ through which trigger signals are input that trigger starting of processing by the logger blocks $150_1$ to $150_w$. In synchronization with the trigger signals input through the trigger input terminals $1503_1$ to $1503_w$, the logger blocks $150_1$ to $150_w$ acquire the digital information or the count information in bit data or word data format output by each general-purpose circuit block, and sequentially write the acquired information to the storage 124. Here, the logger blocks $150_1$ to $150_w$, in synchronization with the trigger signals, sequentially write the acquired digital information or count information to storage areas preset in the storage 124 based on pointer table information described later.

The storage 124 stores the digital information and the count information transferred from the logger blocks $150_1$ to $150_w$ of the input/output controller 126.

The internal memory 122 stores operation parameter information that defines a sequence of operations of the general-purpose circuit blocks included in the input/output controller 126. The internal memory 122 stores the pointer table information LPT that defines the storage areas of the storage 124 to which the logger blocks $150_1$ to $150_w$ each write the digital information or the count information. The internal memory 122 and the non-volatile memory 123 function as determination criterion information storages that store, in association with the count information corresponding to the digital information, determination criterion information indicating a preset determination criterion with respect to a numerical value indicated by the digital information.

The computing unit 121 executes reconfiguration of the general-purpose circuit blocks included in the input/output controller 126 based on operation parameters stored in the internal memory 122. Specifically, the computing unit 121 analyzes the operation parameters stored in the internal memory 122 and determines combinations or order of use of the general-purpose circuit blocks, and operation details. Then the computing unit 121 stores an execution parameter in a register of each general-purpose circuit block of the input/output controller 126 in accordance with the determined operation details. The computing unit 121 executes a wafer inspection process described later, using the digital information and the count information that are stored in the storage 124 and output by the input/output controller 126.

With reference again to FIG. 1, creation of a program to be executed in the PLC 10, setting of various kinds of parameters for the PLC 10, and monitoring of operation status of the PLC 10 are performed by a personal computer (PC) 30 connected via a communication line L1 and a PC interface 103 to the PLC 10.

Figure 5:
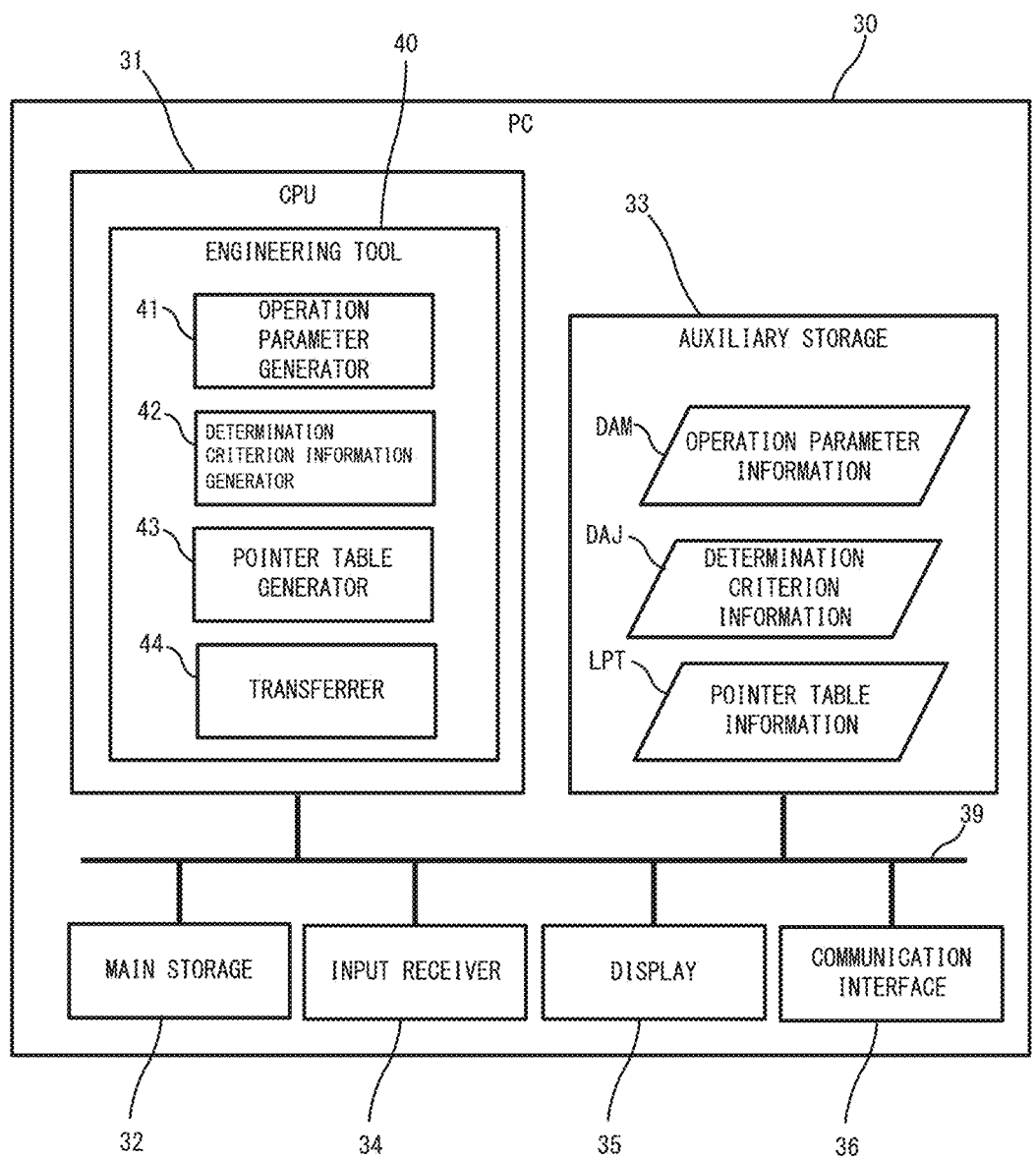
FIG. 5 is a block diagram illustrating a configuration of a personal computer according to the embodiment.

The PC 30, which is, for example, a general-purpose personal computer, includes, a CPU 31, a main storage 32, an auxiliary storage 33, an input receiver 34, a display 35, a communication interface 36, and a bus 39 for connection to each part, as illustrated in FIG. 5. The main storage 32 is a volatile memory and is used as a work area for the CPU 31. The auxiliary storage 33 is anon-volatile memory, such as magnetic disc or a semiconductor flash memory, and stores a program for implementing an engineering tool 40. The CPU reads this program from the auxiliary storage 33 to the main storage 32 and executes the read program, thereby implementing the engineering tool 40. The input receiver 34 is, for example, a keyboard, and receives various kinds of operation information input by a user and outputs the received operation information to the CPU 31. The display 35 is, for example, a liquid crystal display, and displays various kinds of information input by the CPU. The communication interface 36 executes transmission and reception of information between the PC 30 and the PLC in a state in which the PC 30 is connected via the communication line L and the PC interface 103 to the PLC 10.

The engineering tool 40 has functions for generating a program to be executed by the PLC 10, setting the operation details of the PLC 10, and monitoring the operation status of the PLC 10. The input/output controller 126 conforming to specifications of the aforementioned wafer thickness inspection system is to have a function for generating, by applying an analog/digital (A/D) conversion to a current signal input through the analog signal input interface 129, digital information indicating a digital value that corresponds to a signal level of the current signal. In addition, the input/output controller 126 is to have a function for generating count information indicating a count value obtained by counting pulses included in the pulse signal input through the pulse signal input interface 127A. In addition, the input/output controller 126 is to have a function for writing the generated digital information and the generated count information to storage areas preset in the storage 124. The engineering tool 40 generates a program for reconstructing general-purpose circuit blocks for the input/output controller 126 to perform these various kinds of functions. The engineering tool 40 also generates pointer table information LPT that defines areas in the storage 124 to which the digital information and the count information are written. The engineering tool 40 also generates determination criterion information to be used when the computing unit 121 of the input/output control unit 120 determines a thickness of the wafer W. The engineering tool 40 causes the display 35 to appropriately display an engineering tool screen that presents, to a user, information necessary for creation of a program, setting of the operation details of the PLC 10, and monitoring of the operation status of the PLC 10.

The engineering tool 40 has an operation parameter generator 41, a determination criterion information generator 42, a pointer table generator 43, and a transferrer 44. The operation parameter generator 41 generates, based on logic circuit information input by a user via the input receiver 34, operation parameter information indicating an operation parameter of a logic circuit that is implemented using the general-purpose circuit blocks of the input/output controller 126. The logic circuit information includes circuit drawing information and setting information of the logic circuit. The operation parameter generator 41 stores the generated operation parameter information DAM in the auxiliary storage 33. The determination criterion information generator 42 generates determination criterion information necessary for execution of the wafer inspection process described later, using various kinds of digital information stored in the storage 124 of the input/output control unit 120. The determination criterion information generator 42 stores the generated determination criterion information DAJ in the auxiliary storage 33.

The pointer table generator 43 generates, based on the operation parameter information DAM, pointer table information LPT that defines the storage areas of the storage 124 to which the logger blocks $150_1$ to $150_w$ of the input/output controller 126 each write the digital information or the count information. The pointer table generator 43 stores the generated pointer table information LPT in the auxiliary storage 33. Upon receiving from the input receiver 34 a user operation for transferring the operation parameter information DAM, the determination criterion information DAJ, and the pointer table information LPT to the PLC 10, the transferrer 44 transfers such information stored in the auxiliary storage 33 to the PLC 10.

Figure 6:
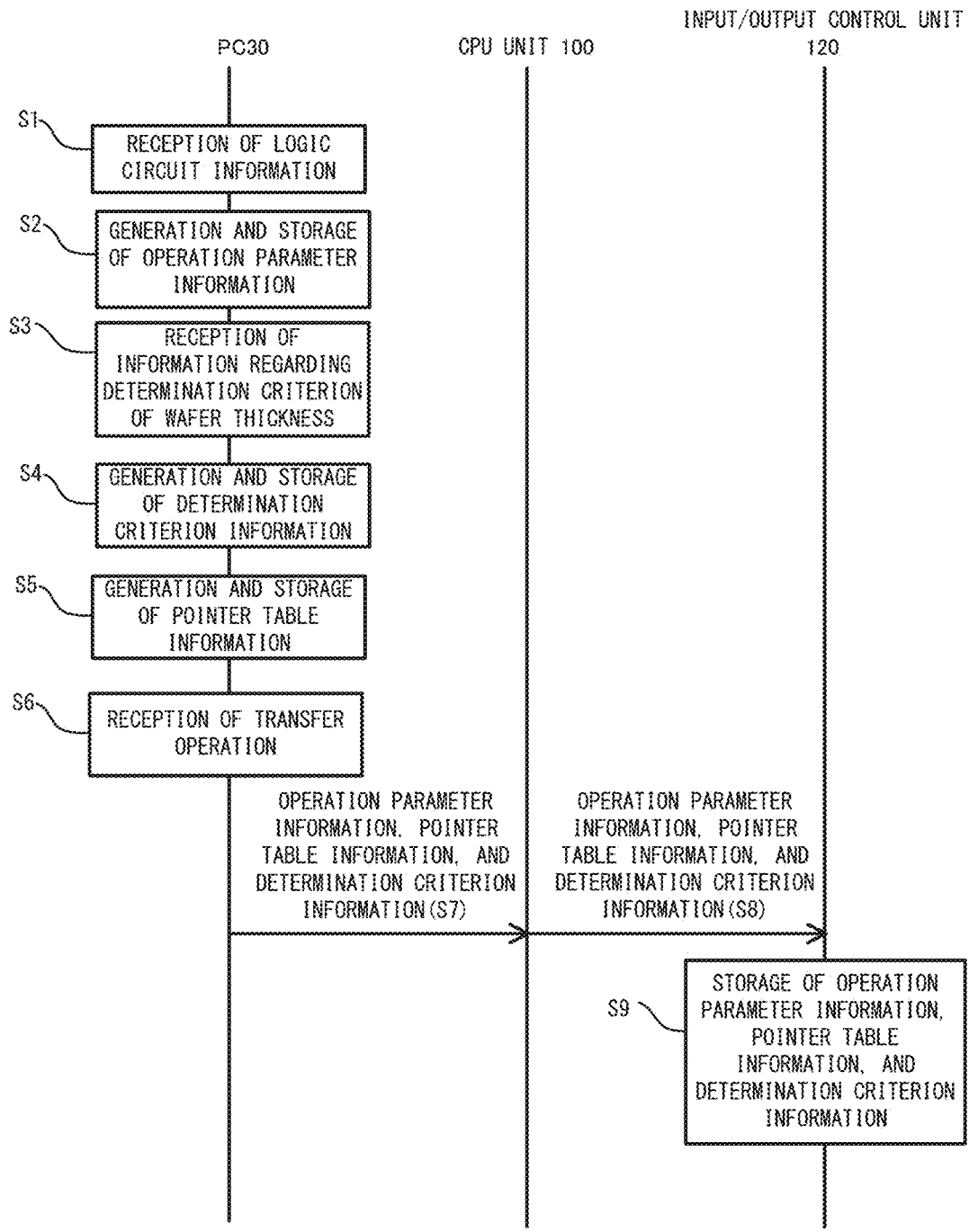
FIG. 6 is a sequence diagram illustrating operations at initial setting of the wafer thickness inspection system according to the embodiment.

Next, a sequence of operations at initial setting of the PLC 10 for use in the wafer thickness inspection system according to the present embodiment is described with reference to FIG. 6. Here, it is assumed that the engineering tool 40 is running on the PC 30 to which the PLC 10 is connected via the communication line L1. It is also assumed that the engineering tool 40 is displaying the engineering tool screen on the display 35. First, the case is considered where a user inputs the aforementioned logic circuit information via the input receiver 34 with reference to the engineering tool screen displayed on the display 35. In this case, the operation parameter generator 41 receives the input logic circuit information (step S1).

Next, the operation parameter generator 41 stores the operation parameter information DAM in the auxiliary storage 33 based on the received logic circuit information (step S2).

Then the case is considered where the user inputs information regarding a determination criterion on a thickness of the wafer W via the input receiver 34 with reference to the engineering tool screen displayed on the display 35. In this case, the determination criterion information generator 42 receives the input information regarding the determination criterion of the thickness of the wafer W (step S3). Then the determination criterion information generator 42 generates the determination criterion information DAJ based on the input information regarding the determination criterion of the wafer W, and stores the generated information in the auxiliary storage 33 (step S4). Here, as illustrated in FIG. 7, the determination criterion information DAJ is information associating information indicating an angle of rotation from an initial position of the wafer W with upper and lower reference values of the thickness of the wafer W at each angle of rotation. In an example illustrated in FIG. 7, the determination criterion value is set at every 360/N degree angle of rotation of the wafer W. The information indicating the angle of rotation is represented by the angle of rotation (360/N)×n degrees, where n is an integer.

With reference back to FIG. 6, the pointer table generator 43 generates, based on the operation parameter information DAM, the pointer table information LPT that defines storage areas of the storage 124 to which the logger blocks $150_1$ to $150_w$ of the input/output controller 126 write the digital information or the count information (step S5).

Figure 8:
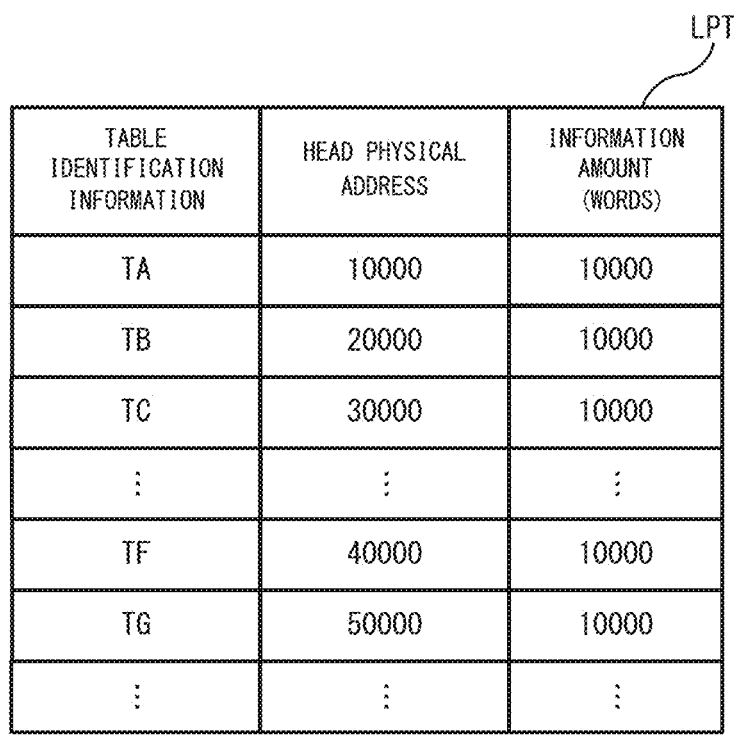
FIG. 8 is a diagram illustrating an example of pointer table information according to the embodiment.

Here, for example, as illustrated in FIG. 8, the pointer table information LPT is information for associating three elements with one another, the three elements being identification information of a table that is a storage area in the storage 124, a head physical address of the table, and an information amount (the number of words) stored in the table. Each head physical address indicates a head physical address of the storage area, in the storage 124, that each of the logger blocks $150_1$ to $150_w$ uses, corresponding to the table identification information. Each of the logger blocks $150_1$ to $150_w$ is assigned consecutive storage areas in the storage 124 by a size specified by the information amount, starting from the corresponding head physical address. Here, each of the tables is set to have the same size.

With reference back to FIG. 6, the case is considered where the user then performs, through the input receiver 34, a transfer operation for transferring to the PLC the operation parameter information DAM, the determination criterion information DAJ, and the pointer table information LPT. In this case, the transferrer 44 receives the transfer operation (step S6). Then the PC 30 transfers via the PC interface 103 to the CPU unit 100 the operation parameter information DAM, the determination criterion information DAJ, and the pointer table information LPT (Step S7).

Then the operation parameter information DAM, the determination criterion information DAJ, and the pointer table information LPT transferred to the CPU unit 100 are transferred via the communication bus interface 104 and 125 and the bus communication line 111 to the input/output control unit 120 (step S8).

Next, in the input/output control unit 120, the computing unit 121 stores in the internal memory 122 the transferred operation parameter information DAM, the transferred determination criterion information DAJ, and the transferred pointer table information LPT (step S9). At this time, the computing unit 121 also stores the operation parameter information DAM, the determination criterion information DAJ, and the pointer table information LPT in the non-volatile memory 123. In this way, the initial setting of the PLC 10 for use in the wafer thickness inspection system is completed.

Then, at the time of inspection of the wafer thickness, the computing unit 121 reconfigures the general-purpose circuit blocks of the input/output controller 126 based on the operation parameter information DAM and the pointer table information LPT that are stored in the internal memory 122. At this time, the computing unit 121 analyzes the operation parameter information DAM and determines combinations or order of use of the general-purpose circuit blocks, and operation details. Then the computing unit 121 stores execution parameters in the register of each general-purpose circuit block in accordance with the determined operation details.

Figure 9:
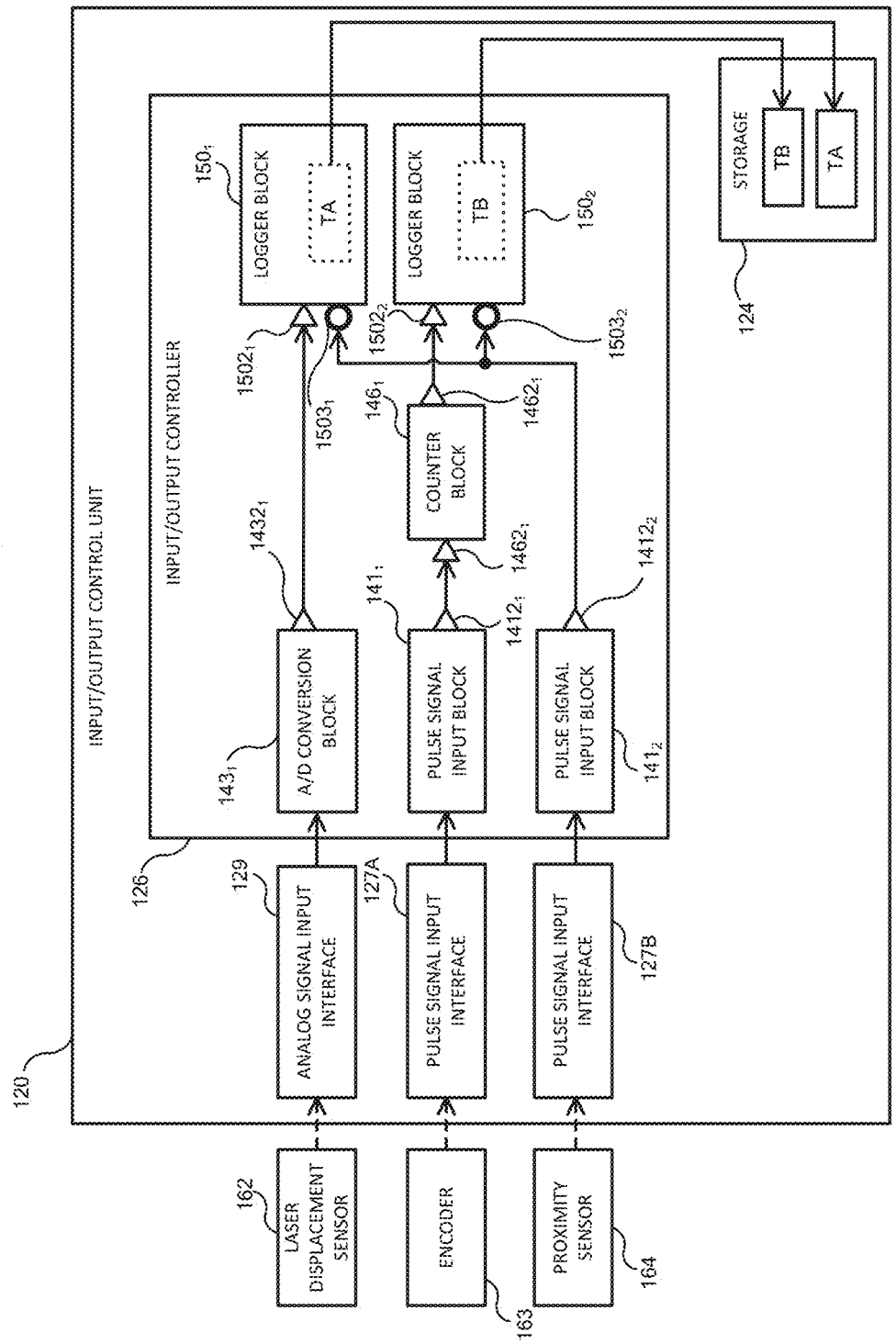
FIG. 9 is a control block diagram of the input/output control unit according to the embodiment.

Next, how the input/output control unit 120 of the PLC 10 for use in the wafer thickness inspection system according to the present embodiment operates at the time of inspection of the wafer thickness is described with reference to FIG. 9. The current signal that is an analog signal output by the laser displacement sensor 162 is input to the analog signal input interface 129, as illustrated in FIG. 9. The analog signal input interface 129 outputs the input current signal to the AD conversion block $143_1$. The A/D conversion block $143_1$ converts the input current signal to digital information indicating a signal level of the current signal, that is, a numerical value indicating a magnitude of the current value. Then the A/D conversion block $143_1$ outputs the digital information indicating the current value of the current signal to the input/output terminal $1502_1$ of the logger block $150_1$ that is the first logger block. The AD conversion block $143_1$ converts the current signal to the digital information and continuously outputs the digital information to the input/output terminal $1502_1$ of the logger block $150_1$, in synchronization with the internal control clock output by the aforementioned clock outputter.

The pulse signal output by the encoder 163 is input to the pulse signal input interface 127A. The pulse signal input interface 127A outputs the input pulse signal to the pulse signal input block $141_1$. The pulse signal input block $141_1$ outputs the input pulse signal to the counter block $146_1$. The counter block $146_1$ counts pulses included in the input pulse signal and generates digital information indicating the count value. Then the counter block $146_1$ outputs the digital information indicating the count value to the input/output terminal $1502_2$ of the logger block $150_2$ that is the second logger block. Here, the counter block $146_1$ continuously outputs the digital information indicating the count value to the input/output terminal $1502_2$ of the logger block $150_2$, in snchronization with the aforementioned internal control clock having a period of nanoseconds. In addition, the pulse signal output by the proximity sensor 164 is input to the pulse signal input interface 127B. The pulse signal input interface 127B outputs the input pulse signal to the pulse signal input block $141_2$. The pulse signal input block $141_2$ functions as the trigger block that outputs the input pulse signal as a trigger signal to the trigger input terminals $1503_1$ and $1503_2$ of the logger blocks $150_1$ and $150_2$. That is, the pulse signal input block $141_2$ functions as the trigger outputter that outputs the trigger signal to the logger block $150_1$ and the logger block $150_2$.

The logger block $150_1$ and the logger block $150_2$ each take the digital information and the count information reaching the input/output terminals $1502_1$ and $1502_2$ at the leading edge or trailing edge time of the pulse signal. The digital information reaching the input/output terminal $1502_1$ of the logger block $150_1$ at this time is the information indicating the current value of the current signal output by the laser displacement sensor 162, that is, the digital information indicating the thickness of the wafer W. The digital information reaching the input/output terminal $1502_2$ of the logger block $150_2$ is the digital information indicating the count value of pulses included in the pulse signal output by the encoder 163, that is, the count information indicating an angle of rotation from the initial position of the wafer W. Then the logger block $150_1$ and the logger block $150_2$ write, based on the table identification information of the respective tables that the logger blocks $150_1$ and $150_1$ use, the thickness of the wafer W and the count information, indicating the angle of rotation from the initial position, to an storage area of the storage 124 corresponding to each table identification information.

Figure 10:
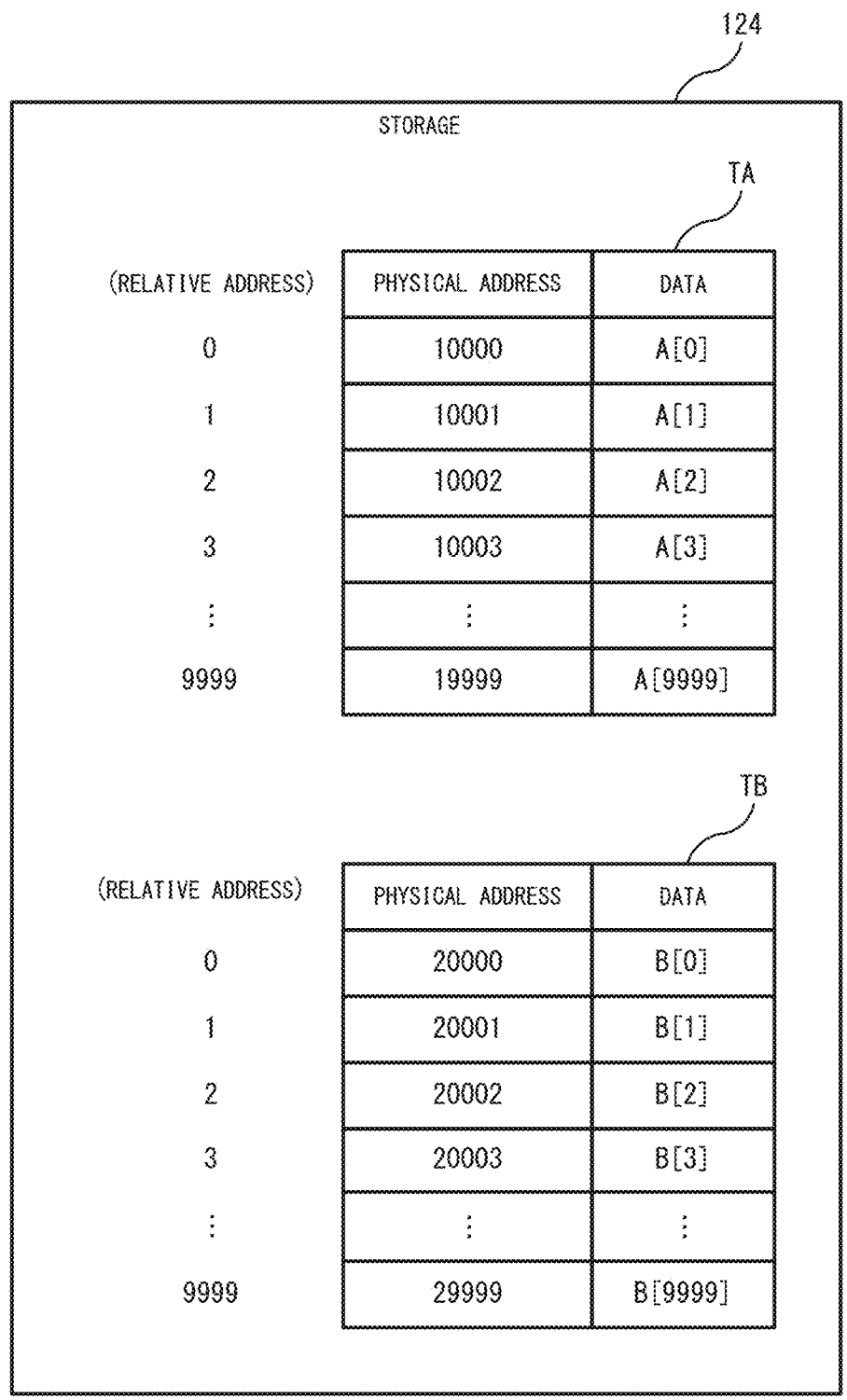
FIG. 10 is a drawing illustrating an example of tables stored in a storage according to the embodiment.

Here, when the information amount of each table is assumed to be set to "10000" in the pointer table information LPT, as illustrated in FIG. 8, the logger block $150_n$ accesses the storage 124 based on relative addresses of 0 to 9999. The table identification information of the table that the logger block $150_1$ uses is assumed to be set to "TA", and the table identification information of the table that the logger block $150_2$ uses is assumed to beset to "TB". In this case, the logger block $150_1$ writes the digital information indicating the thickness of the wafer W to storage areas that are the first storage areas in the storage 124 corresponding to the table TA. These storage areas are storage areas specified by the physical addresses that are consecutive physical addresses from "10000" to "19999". The logger block $150_2$ writes the count information, indicating an angle of rotation from the initial position of the wafer W, to storage areas that are the second storage areas in the storage 124 corresponding to the table TB. These storage areas are storage areas specified by the physical addresses that are consecutive physical addresses from "20000" to "29999". The first relative address represented by a value of difference between the physical address of the storage area in which the aforementioned digital information is stored and the physical address "10000" of the first storage area corresponding to the table TA is equal to the second relative address represented by a value of difference between the physical address of the storage area in which the count information associated with the digital information is stored and the physical address "20000" of the first storage area corresponding to the table TB. At this time, by referencing the physical addresses corresponding to the first relative address and the second relative address, the logger block $150_1$ and the logger block $150_2$ write at high speed the digital information and the count information to the storage 124 by hardware processing. Thus the digital information A[0] to A[9999] and the digital information B[0] to B[9999] is stored in the respective storage areas corresponding to the tables TA and TB of the storage 124, for example, as illustrated in FIG. 10. In this way, two different kinds of information, which are the digital information indicating the thickness of the wafer W and the count information indicating the angle of rotation from the initial position of the wafer W, are written simultaneously into different storage areas in the storage 124 based on the first relative address and the second relative address that are the same.

Upon completion of writing of the digital information equivalent to a single turn of a single wafer W, indicating the thickness of the wafer W and the angle of rotation form the initial position of the wafer W, the logger blocks $150_1$ and $150_2$ outputs to the computing unit 121 inspection completion notifying information for notification of completion of inspection of a single wafer W.

Figure 11:
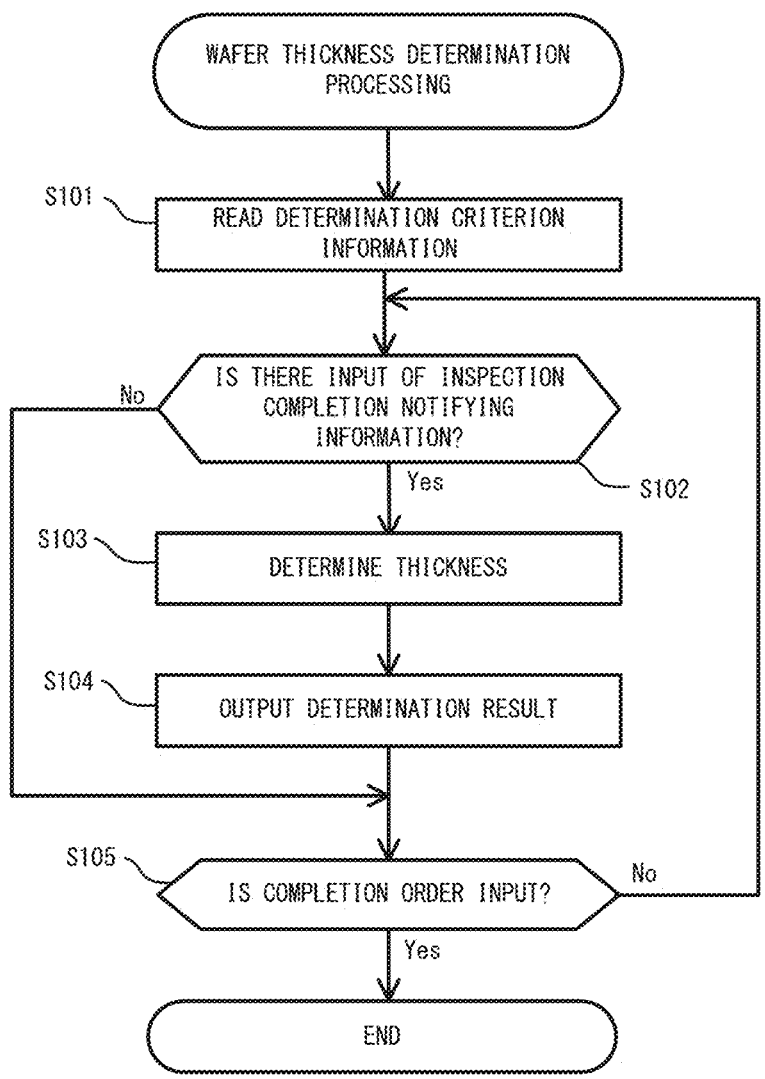
FIG. 11 is a flow chart illustrating an example of wafer thickness determination processing executed by a computing unit of an input/output control unit of a programmable logic controller (PLC) according to the embodiment.

Next, wafer thickness determination processing executed by the computing unit 121 of the input/output control unit 120 of the PLC 10 for use in the wafer thickness inspection system according to the present embodiment is described with reference to FIG. 11. This wafer thickness determination processing is executed after completion of the aforementioned initial setting on the PLC 10 for use in the wafer thickness inspection system. First, the computing unit 121 reads determination criterion information from the non-volatile memory 123 (step S101). The computing unit 121, for example at power-up of the PLC 10, reads the determination criterion information from the non-volatile memory 123 and writes the information in the internal memory 122.

Next, the computing unit 121 determines whether there is input of the inspection completion notifying information from the logger block $150_1$ and the logger block $150_2$ (step S102). As described above, upon completion of writing, by the logger blocks $150_1$ and $150_2$, of the digital information on a single wafer W to the storage 124, indicating the thickness of the wafer W and the angle of rotation from the initial position of the wafer W, the inspection completion notifying information is input to the computing unit 121. The computing unit 121 executes processing of step S105 described later when determining that there is no input of the inspection completion notifying information from the logger block $150_1$ and the logger block $150_2$ (No in step S102).

Figure 12:
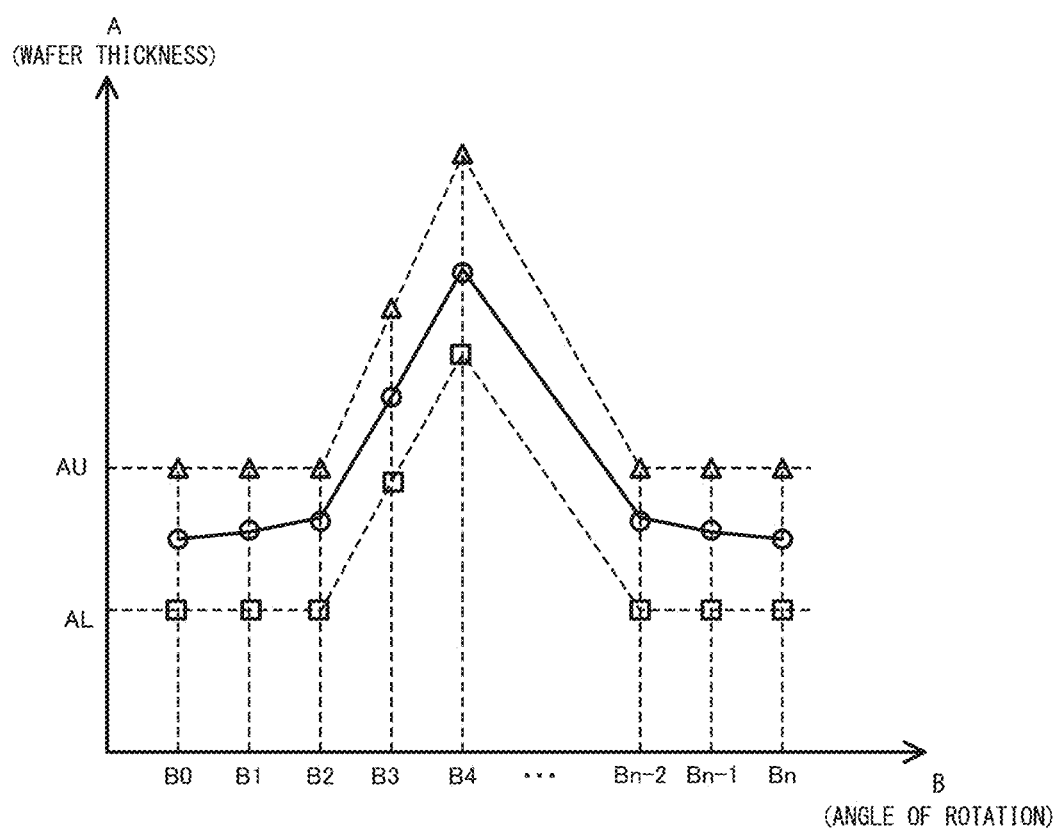
FIG. 12 is a drawing illustrating an example determination result of the wafer thickness determination processing according to the embodiment.
Figure 13:
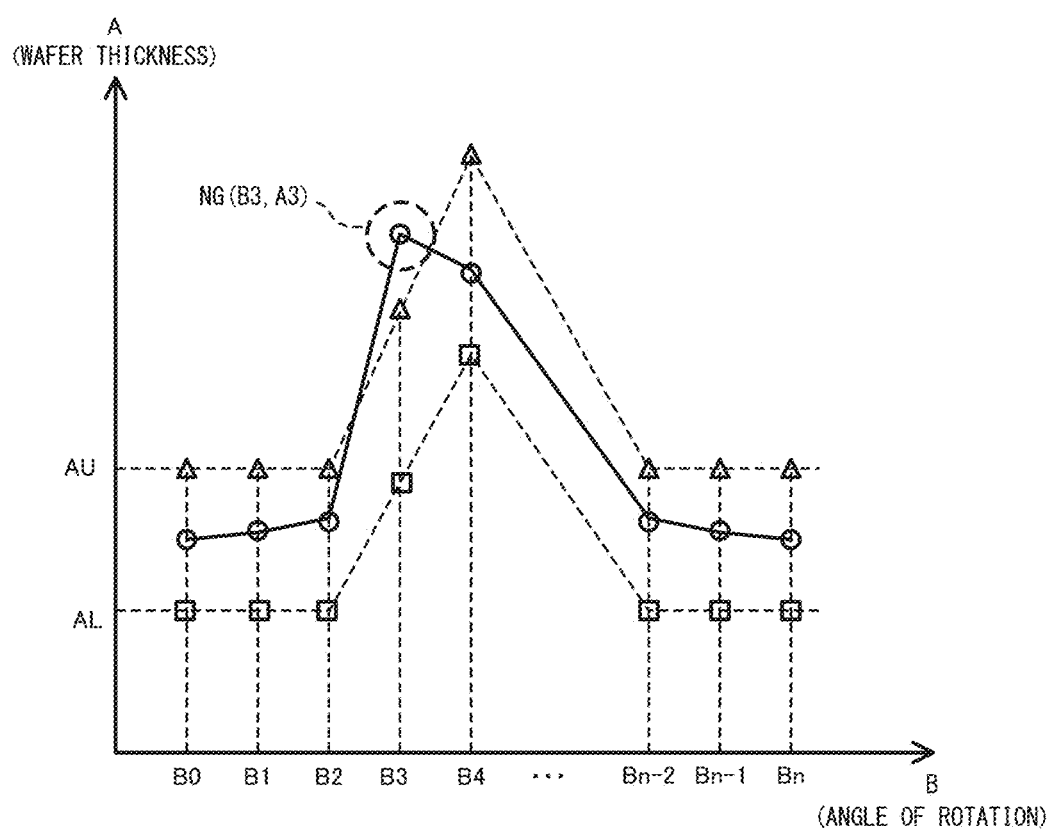
FIG. 13 is a drawing illustrating an example of determination processing of the wafer thickness determination processing according to the embodiment.

By contrast, when determining that the computing unit 121 has input of the inspection completion notifying information from the logger block $150_1$ and the logger block $150_2$ (Yes in step S102), the computing unit 121 executes determination of the thickness of the wafer W (step S103). Here, the computing unit 121 determines whether the thickness of the wafer W at each angle of rotation is equal to or less than the upper reference value and equal to or more that the lower reference value that are indicated by the determination criterion information, for example as illustrated in FIG. 7. Specifically, the computing unit 121 sequentially obtains a wafer thickness An and an angle of rotation Bn that indicate the digital information of the thickness of the wafer W and the digital information indicating the angle of rotation from the initial position of the wafer W, respectively, and retrieves the determination criterion information corresponding to the angle of rotation Bn. Then the computing unit 121 determines whether the wafer thickness An is equal to or less than the upper reference value AU and the lower reference value AL that are indicated by the determination criterion information corresponding to the angle of rotation Bn. For example, as illustrated in FIG. 12, the computing unit 121 determines, for all the angles of rotation Bn, that when the thickness An of the wafer W is equal to or less than the upper reference value and the lower reference value AL, the corresponding thickness of the wafer W is "OK". By contrast, for example, as illustrated in FIG. 13, in the case of determination, for the angle of rotation B3, that the wafer thickness A3 exceeds the upper reference value AU, the computing unit 121 determines that the corresponding thickness of the wafer W is "NG".

In this way, the computing unit 121 functions as a determiner that acquires the digital information and the count information from the storage area corresponding to the table TA of the internal memory 122 and the storage are corresponding to the table TB of the internal memory 122, and determines based on the determination criterion information whether the numerical value indicated by the obtained digital information satisfies the determination criterion.

Then the computing unit 121 outputs the determination result of determining the thickness of the wafer W to the storage 124 (step S104).

Then the computing unit 121 determines whether a completion instruction to order completion of the wafer thickness determination processing is input (step S105). Here, the completion instruction is input to the computing unit 121, for example when a user performs an operation to stop the PLC 10. When determining that the completion instruction is not input (No in step S105), the computing unit 121 executes processing of the step S102 again. By contrast, when the computing unit 121 determines that the completion instruction is input (Yes in step S105), the wafer thickness determination processing ends. Thus information indicating the determination result about the thickness of each wafer W through the wafer thickness determination processing is stored in the storage 124. The information indicating the determination result about the thickness of each wafer W stored in this storage 124 can be transferred, for example, to the PC 30. Then when a program for the wafer thickness inspection processing is running in the PC 30, a graph indicating the determination result of the thickness of the wafer W, for example as illustrated in FIGS. 12 and 13 where the vertical axis is a thickness of the wafer W and the horizontal axis indicates an angle of rotation Bn of the wafer W from the initial position, may be displayed on the display 35. For example as illustrated in FIG. 13, the angle of rotation "B3" and the thickness "A3" of the wafer W with the determination result of "NG" may be displayed for the wafer W with the determination result of "NG".

Figure 14A:
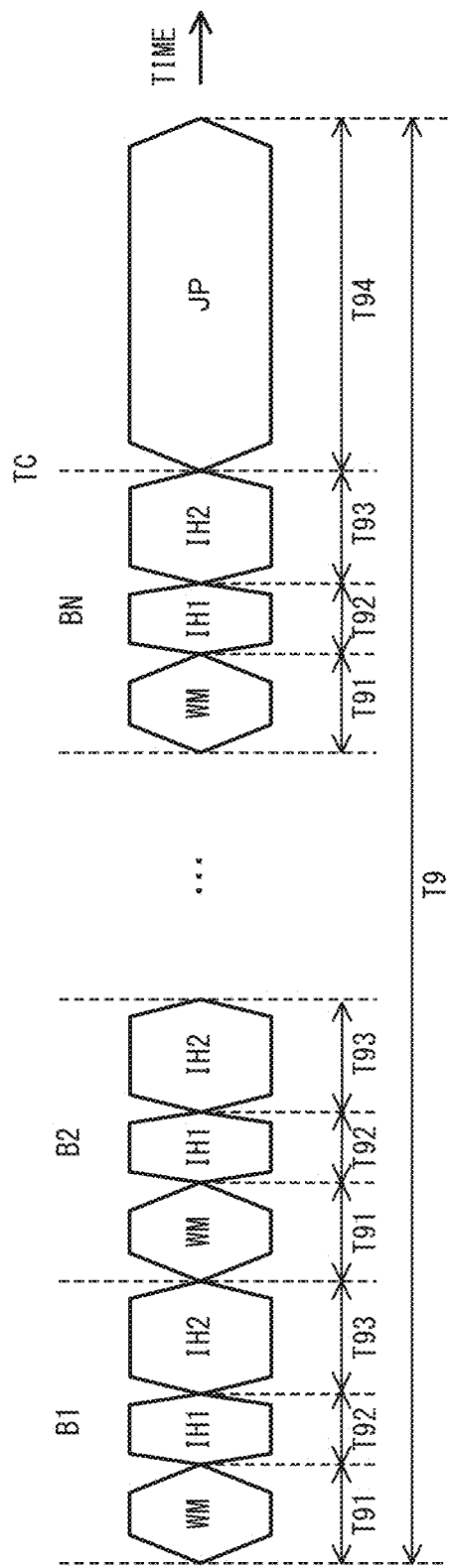
FIG. 14A is a time chart for describing operations of a programmable logic controller according to a comparative example.

In a conventional PLC, the CPU unit generally executes processing for associating the digital information of the thickness of the wafer W with the count information indicating the angle of rotation. Thus the CPU unit needs to perform synchronous processing between the CPU unit and the input/output control unit and reading processing of the digital information and the count information from the input/output control unit as required, to obtain the digital information indicating the thickness of the wafer W and the count information indicating the angle of rotation of the wafer W from the input/output control unit. Here, the as-required reading processing is processing for the CPU unit to read the digital information and the count information stored in a set of storage areas of the input/output control unit before the information is overwritten by other digital information and count information transferred to the set of storage areas. For example, the CPU unit 100 configured to store in the memory 102 the digital information indicating the thickness of the wafer W acquired by the input/output control unit 120 and the count information indicating the angle of rotation of the wafer W can be considered as a comparative example of this conventional PLC. In this case, the CPU unit 100 executes processing of reading the digital information and the count information via the bus communication line 111 from the internal memory 122 as required, before a set of digital information and count information stored in a set of storage areas of the internal memory 122 in the input/output control unit 120 is overwritten by another set of digital information and count information transferred to the internal memory 122. For example, as illustrated in FIG. 14A, a writing period WM, an overhead period IH1, and a transfer period IH2 occur every time the angle of rotation of the wafer W changes. In the writing period WM, the digital information and count information are written by the logger block 150$_1$ and the logger block 150$_2$ to the internal memory 122 of the count information. In the overhead period IH1, preparation for transferring the digital information and the count information to the CPU unit 100 is performed. In the transfer period IH2, the digital information and the count information are actually being transferred to the CPU unit 100. At a time TC when the inspection completion notifying information is input to the computing unit 121, the process enters a wafer thickness determination period JP. In this case, time T9 (=(T91+T92+T93)×N+T94) passes until completion of determination of the thickness of a single wafer W since the start of the determination.

Figure 14B:
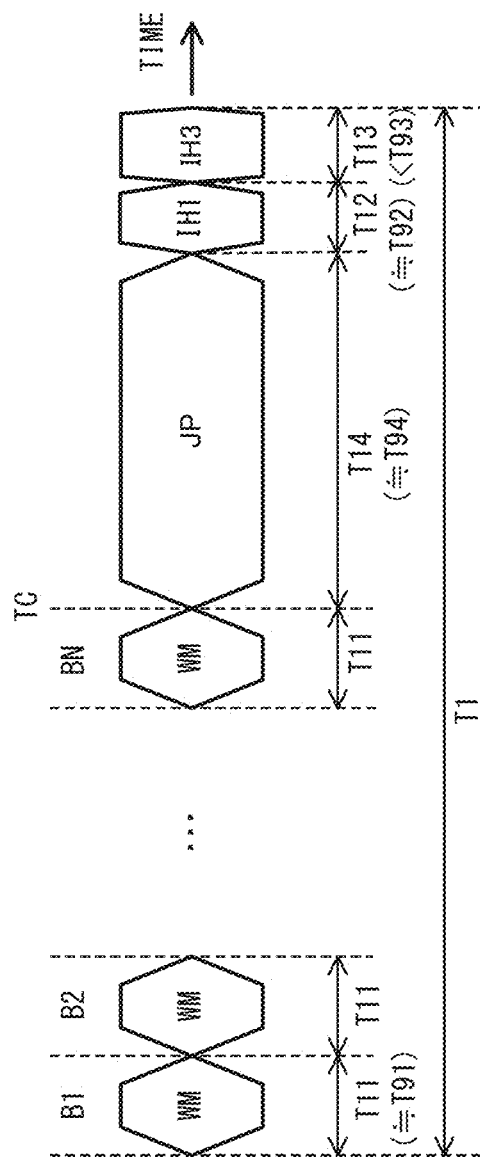
FIG. 14B is a time chart for describing operations of the programmable logic controller according to the embodiment.

By contrast, in the PLC 10 according to the present embodiment, the logger block 1501 sequentially writes the digital information indicating the thickness of the wafer W in the storage areas corresponding to the tables TA of the storage 124. The logger block 1502 sequentially writes the count information indicating the angle of rotation from the initial position of the wafer W to the storage areas corresponding to the tables TB in the storage 124. Thus, as illustrated in FIG. 14B, only the writing period WM in which the digital information and the count information are written to the storage 124 by the logger block 150$_1$ and the logger block 150$_2$ occurs every time the angle of rotation of the wafer W changes. Then at a time TC when the inspection completion notifying information is input to the computing unit 121, the process goes to the wafer thickness determination period JP. Then after completion of the wafer thickness determination, the overhead period IH1 for execution of preparation for transferring the information indicating the determination result from the input/output control unit 120 to the CPU unit 100 and the transfer period IH3 for transferring the information indicating the determination result occur. In particular, when the information indicating the determination result is information only showing "OK" or "NG" as the result of determination of the wafer thickness, the information has a size smaller than the digital information or the count information. FIG. 14B illustrates a case in which the information indicating the determination result is information only showing "OK" or "NG" as the result of determining the wafer thickness. In this case, time T10 (=T11×N+T14+T12+T13) passes until completion of determination of the thickness of a single wafer W since the start of the determination. Here, if the times T11, T12, and T14 have lengths similar to the times T91, T92, and T94, respectively, and the time T13 is less than the time T93, the time T1 required for thickness inspection for a single wafer W in the case of the PLC 10 according to the present embodiment is shortened by at least a time (T92+T93)×(N−1) compared with the PLC according to the aforementioned comparative example. Thus throughput improvement resulting from the improved processing speed of the wafer thickness inspection system can be obtained.

As described above, according to the input/output control unit 120 according to the present embodiment, the logger block $150_1$, in synchronization with the trigger signal, transfers the digital information indicating the thickness of the wafer W to the storage areas of the storage 124 corresponding to the table TA. In addition, the logger block $150_2$, in synchronization with the trigger signal, transfers the count information indicating the angle of rotation from the initial position of the wafer W to the storage areas of the storage 124 corresponding to the table TB, in association with the digital information indicating the thickness of the wafer W. Thus, for example, the CPU unit 100 does not need to perform the reading processing of reading, as required, the digital information and the count information stored in a single set of storage areas in the input/output control unit 120 before the digital information and the count information are overwritten by digital information and count information newly transferred to the single set of storage areas. In addition, the input/output control unit 120 can store in the storage 124 the simultaneously obtained digital information and count information in association with each other. Accordingly, for example, since a period of the trigger signal can be shortened regardless of the processing speed of the CPU unit 100, the digital information and the count information can be obtained simultaneously in a short time interval, and the processing speed of the PLC 10, or the processing speed of the wafer thickness inspection system can be improved.

In the input/output control unit 120 according to the present embodiment, the pulse signal input block $141_2$ functions as the trigger outputter that outputs as the trigger signal, to the trigger input terminals $1503_1$ and $1503_2$ of the logger block $150_1$ and the logger block $150_2$, the pulse signal as is input via the pulse signal input interface 127B from the proximity sensor 164. This can reduce a time lag between detection of a wafer W by the proximity sensor 164 and writing of digital information on the wafer W by the logger blocks $150_1$ and $150_2$. Thus accuracy of thickness determination of the wafer W can be advantageously improved.

According to the wafer thickness inspection system according to the present embodiment, the input/output control unit 120 executes determination on the thickness of the wafer using the digital information indicating the thickness of the wafer W and the count information indicating the angle of rotation from the initial position of the wafer W that are stored in the storage 124. This enables the input/output control unit 120 to execute alone a sequence of processing from measurement of the thickness of the wafer W to determination as to whether the thickness of the wafer W satisfies a determination criterion indicated by the preset determination criterion information. That is, since a step of transferring the digital information and the count information to the CPU unit 100 during the sequence of processing from the measurement of the thickness of the wafer W to the determination of the thickness of the wafer W is eliminated, faster processing to perform determination on the thickness of the wafer W can be advantageously obtained. In addition, the scale of the wafer thickness inspection system can be reduced.

Figure 15:
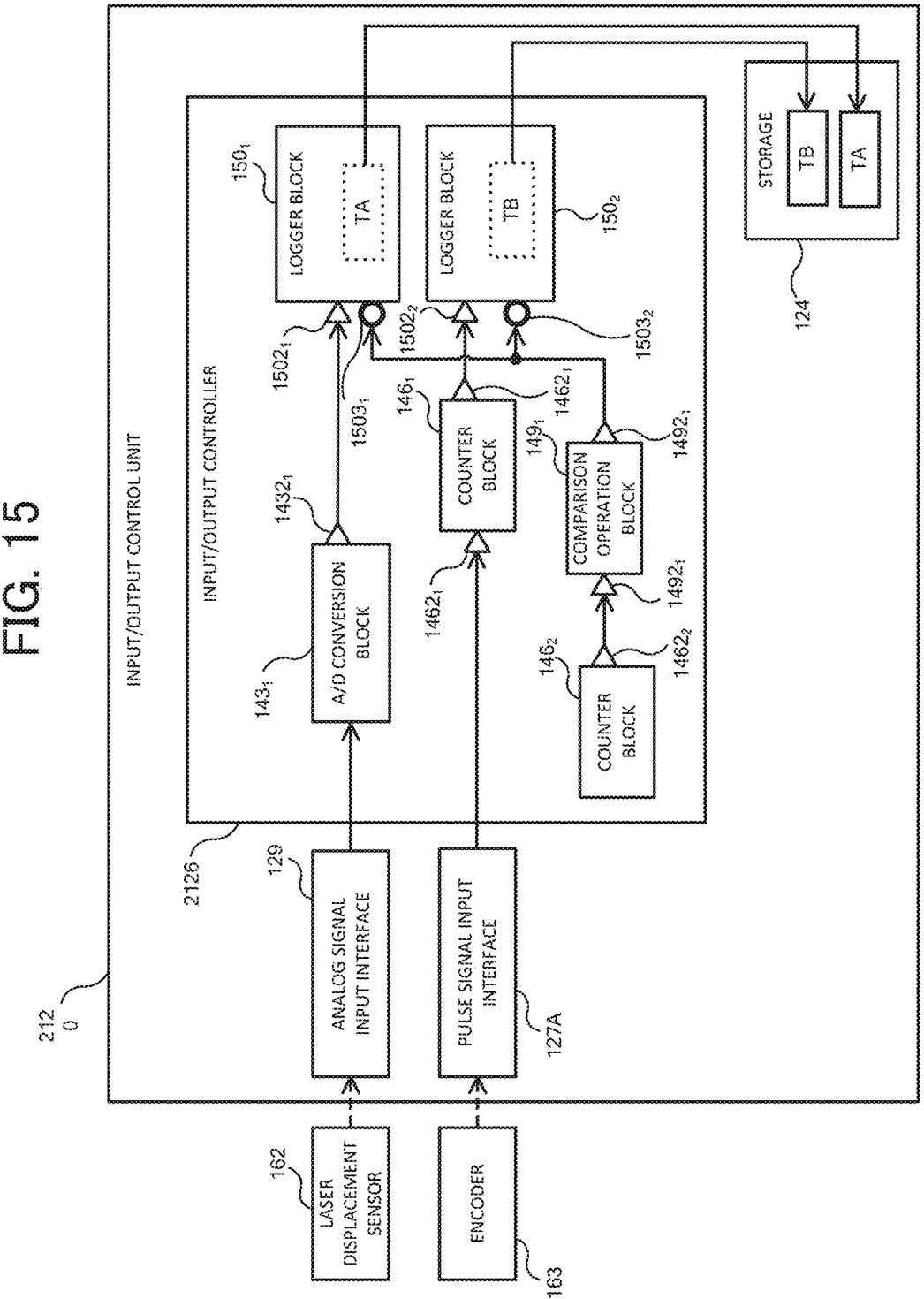
FIG. 15 is a control block diagram of an input/output control unit according to a variation.

Although the present embodiment is described above, the present disclosure is not limited thereto. For example, as in the input/output control unit 2120 illustrated in FIG. 15, the logger block $150_1$ and the logger block $150_2$ may take digital information and count information using a trigger signal generated by the counter block $146_2$ of the input/output controller 2126. The input/output controller 2126 of the input/output control unit 2120 differs from the input/output controller 126 according to the present embodiment in that the input/output controller 2126 has a counter block $146_2$ that functions as a ring counter that operates at a constant period, and a comparison operation block $149_1$. The counter block $146_2$ and the comparison operation block 1491 function as a trigger outputter that outputs trigger signals to the logger block $150_1$ and the logger block $150_2$, respectively.

Here, the current signal output by the laser displacement sensor 162 is input to the analog signal input interface 129, and the analog signal input interface 129 outputs the current signal to the A/D conversion block $143_1$. The A/D conversion block $143_1$ converts the input current signal to the current value of the current signal, that is, the digital information indicating the thickness of the wafer W. Then the A/D conversion block $143_1$ outputs the digital information to the input/output terminal $1502_1$ of the logger block $150_1$. The pulse signal output by the encoder 163 is input to the pulse signal input interface 127A and the pulse signal input interface 127A outputs the pulse signal to the counter block $1462_1$. The pulse signal input block $141_1$ outputs the input pulse signal to the counter block $146_1$. The counter block $146_1$ counts pulses included in the input pulse signal, and generates the count value, that is, the count information indicating the angle of rotation from the initial position of the wafer W. Then the counter block $146_1$ outputs the count information to the input/output terminal $1502_2$ of the logger block $150_2$.

In addition, the counter block $146_2$ outputs the count information indicating the count value to the comparison operation block $149_1$. A count threshold for the count value is preset for this comparison operation block $149_1$. The comparison operation block $149_1$ compares the count threshold with the count value indicated by the count information input from the counter block $146_2$. Then the comparison operation block 1491 outputs pulsed trigger signals to the trigger input terminals $1503_1$ and $1503_2$ of the logger block $150_1$ and the logger block $150_2$ when the count value is equal to the count threshold. The logger block $150_1$ and the logger block $150_2$ each take the digital information and the count information reaching the input/output terminals $1502_1$ and $1502_2$ at the leading edge or trailing edge time of the trigger signal input by the comparison operation block $149_1$. Then the logger block $150_1$ and the logger block $150_2$ write, based on the table identification information of the respective tables that the logger blocks $150_1$ and $150_2$ use, the digital information and the count information to a storage area of the storage 124 corresponding to each table identification information.

According to this configuration, the digital information and the count information can be obtained simultaneously at a freely-selected timing even if the trigger signal is not input from the exterior of the input/output control unit 2120.

In the embodiment, an example is described in which the input/output control unit 120 includes an embedded storage 124, and the logger blocks $150_1$ and $150_2$ transfer to the storage 124 the digital information and the count information corresponding to the signal level of the analog signal. However, embodiments of the present disclosure are not limited thereto. For example, the input/output control unit 120 may include a storage other than the embedded storage 124, that is, an external storage, and the logger blocks $150_1$ and $150_2$ may transfer to the external storage the digital information and the count information corresponding to the signal level of the analog signal.

In the embodiment, an example is described in which the determination criterion information indicates the upper limit and the lower limit of the thickness of the wafer W, but the content indicated by the determination criterion information is not limited to that of this example. For example, indication of only the lower limit or the upper limit of the thickness of the wafer W by the determination criterion information is permissible.

In the embodiment, an example is described in which the wafer thickness inspection unit 16 is connected to the PLC 10, but embodiments of the present disclosure is not limited thereto. An external device that outputs another analog signal and an external device that outputs another pulse signal or a digital signal may be connected to the PLC 10.

In the embodiment, an example is described in which the computing unit 121 of the input/output control unit 120 functions as a determiner that obtains the digital information and the count information from the internal memory 122 and determines, based on the determination criterion information, whether the numerical value indicated by the obtained digital information satisfies the determination criterion. However, embodiments of the present disclosure are not limited to such configuration. For example, the computing unit 101 of the CPU unit 100 may function as the determiner. In this case, the computing unit 101 may obtain the digital information and the count information via the communication bus interface 104 and 125 and the bus communication line 111 from the storage area storing the digital information and the storage area storing the count information of the storage 124 of the input/output control unit 120. Here, after pieces of digital information and pieces of count information that are necessary for determination by the determiner are stored in their two corresponding storage areas of the storage 124, the CPU unit may obtain the pieces of digital information and the pieces of count information together from their two corresponding storage areas of the storage 124. In this case, the memory 102 of the CPU unit 100 stores the determination criterion information. Then the computing unit 101 determines, based on the determination criterion information stored in the memory 102, whether the numerical value indicated by the obtained digital information satisfies the determination criterion.

Figure 16:
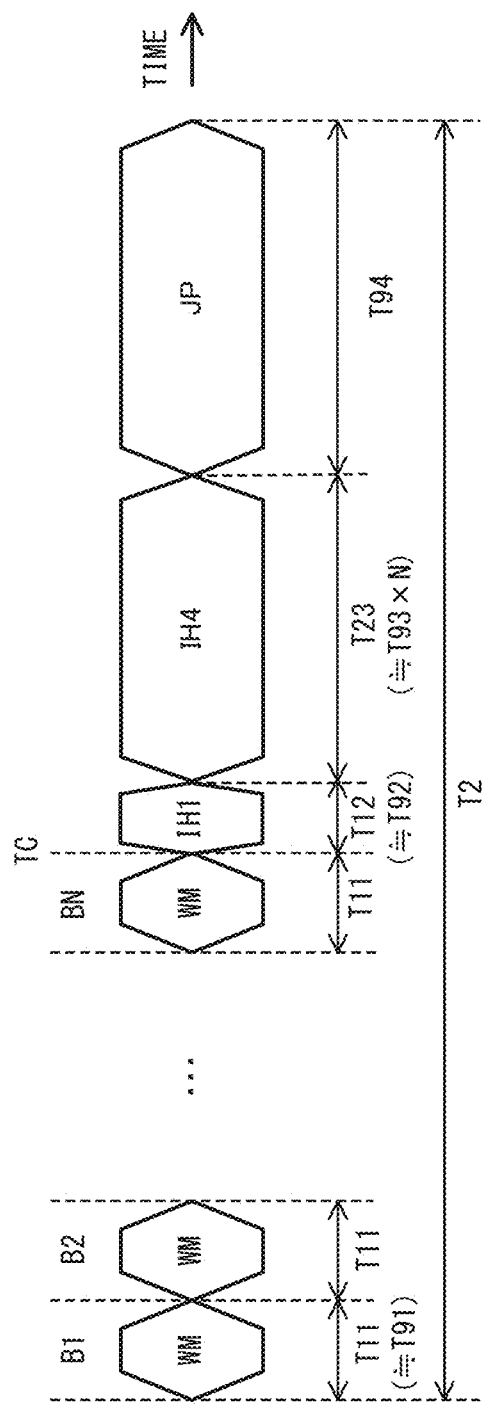
FIG. 16 is a time chart for describing operations of a programmable logic controller according to a variation.

In the PLC according to the variation, as illustrated in FIG. 16, the writing period WM in which the digital information and the count information are written to the storage 124 by the logger block $150_1$ and the logger block $150_2$ occurs every time the angle of rotation of the wafer W changes. In FIG. 16, the reference signs that are the same as those in FIGS. 14A and 14B have the same meaning as those in FIGS. 14A and 14B. The case is considered where at the time TC, the computing unit 121 receives an input of writing completion notifying information that notifies that writing to the storage 124 all the digital information and the count information for a single wafer W to the computing unit 121 is completed. In this case, the overhead period IH1 occurs for execution of the preparation for transferring to the CPU unit 100 the digital information and the count information written to the storage 124, and a transfer period IH4 also occurs for transferring the digital information and the count information to the CPU unit 100. Then the process enters a wafer thickness determination period JP for determination of the thickness of the wafer W in the CPU unit 100. In this case, time $T2=T11 \times N+T12+T23+T94$ passes until completion of determination of the thickness of a single wafer W since the start of the determination. Here, time T23 is substantially the length of time $T93 \times N$. In this case, the time T2 required for thickness inspection for a single wafer W in the case of the PLC according to the variation is shortened by the time $T92 \times (N-1)$ that corresponds to a sum of the overhead periods $IH1 \times (N-1)$, compared with the PLC according to the aforementioned comparative example.

According to this configuration, since the number of transfers to the CPU unit 100 of the digital information and the count information written to the storage 124 can be reduced, the time necessary for preparation for transferring the digital information and the count information to the CPU unit 100 is reduced accordingly. Thus throughput improvement resulting from the improved processing speed of the wafer thickness inspection system can be obtained. In addition, according to the configuration, in parallel with the transfer processing of the digital information and the count information to the internal memory 122, in the input/output control unit 120, the CPU unit 100 can determine whether the numerical value indicated by the digital information obtained in the input/output control unit 120 satisfies the determination criterion. This can reduce the time necessary for a sequence of processing including the processing of obtaining the digital information and the count information and the processing of determining whether the numerical value indicated by the digital information satisfies the determination criterion.

In the embodiment, an example is described in which the first signal is an analog signal and the second signal is a pulse signal, and the first input interface is an analog signal input interface and the second input interface is a pulse signal input interface. However, the first signal and the second signal are not limited to such configuration. For example, both the first signal and the second signal may be analog signals, or both the first signal and the second signal may be digital signals. In this case, both of the first input interface and the second input interface may be configured to be analog signal interfaces or the pulse signal input interfaces.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the fill range of equivalents to which such claims are entitled.

INDUSTRIAL APPLICABILITY

The present disclosure is applicable to, for example, an input/output control unit of a PLC for use in the semiconductor manufacturing field.

REFERENCE SIGNS LIST

10 PLC
16 Wafer thickness inspection unit
30 Personal computer

31 CPU
32 Main storage
33 Auxiliary storage
34 Input receiver
35 Display
36 Communication interface
39 Bus
40 Engineering tool
41 Operation parameter generator
42 Determination criterion information generator
43 Pointer table generator
44 Transferrer
100 CPU unit
101, 121 Computing unit
102 Memory
102a Parameter
102b ladder program
103 PC interface
104, 125 Communication bus interface
110 Base unit
111 Bus communication line
120, 2120 Input/output control unit
120a Input/output interface
122 Internal memory
123 Non-volatile memory
124 Storage
126, 2126 Input/output controller
127A, 127B Pulse signal input interface
128 Digital signal output interface
129 Analog signal input interface
130 Analog signal output interface
140 Circuit block switching bus
$141_1$ to $141_q$ Pulse signal input block
$142_1$ to $142_r$ Digital signal output block
$143_1$ to $143_p$ A/D conversion block
$144_1$ to $144_o$ D/A conversion block
$145_1$ to $145_x$ Filter block
$146_1$ to $146_y$ Counter block
$147_1$ to $147_z$ logical operation block
$148_1$ to $148_v$ Arithmetic operation block
$149_1$ to $149_u$ Comparison operation block
$150_1$ to $150_w$ Logger block
161 Turntable
162 Laser displacement sensor
163 Encoder
164 Proximity sensor
165 Switch
166 Valve
$1411_1$ to $1411_q$, $1421_1$ to $1421_r$, $1431_1$ to $1431_p$, $1441_1$ to $1441_o$, $1451_1$ to $1451_x$, $1461_1$ to $1461_y$, $1471_1$ to $1471_z$, $1481_1$ to $1481_v$, $1491_1$ to $1491_u$, $1501_1$ to $1501_w$ Register $1412_1$ to $1412_q$, $1422_1$ to $1422_r$, $1432_1$ to $1432_p$, $1442_1$ to $1442_o$, $1452_1$ to $1452_x$, $1462_1$ to $1462_y$, $1472_1$ to $1472_z$, $1482_1$ to $1482_v$, $1492_1$ to $1492_u$, $1502_1$ to $1502_w$ Input/output terminal
$1503_1$ to $1503_w$ Trigger input terminal
DAJ Determination criterion information
DAM Operation parameter information
L1, L2 Communication line
LPT Pointer table information
W Wafer

The invention claimed is:
1. An input/output control unit comprising:
a storage;
an input/output controller;
a first input interface to be connected to a first device and output to the input/output controller a first signal input by the first device; and
a second input interface to be connected to a second device and output to the input/output controller a second signal input by the second device,
the input/output controller comprising
a trigger outputter to generate a trigger signal,
a first logger block to store, in synchronization with the trigger signal, first information in preset first storage areas in the storage, the first information being based on the first signal, and
a second logger block to store, in synchronization with the trigger signal, second information in preset second storage areas in the storage in association with the first information, the second information being based on the second signal, wherein
the first signal is an analog signal,
the second signal is a pulse signal, and
the input/output control unit further comprises
a digital information generation block to generate, as the first information, digital information indicating a digital value corresponding to a signal level of the first signal by analog-to-digital conversion of the first signal, and
a counter block to generate, as the second information, count information indicating the count value obtained by counting pulses included in the second signal, and output the generated information.

2. The input/output control unit according to claim 1, wherein
the input/output controller comprises general-purpose circuit blocks, and is reconfigurable by changing combinations and order of use of the general-purpose circuit blocks, and
general-purpose circuit blocks that function as the trigger outputter, the digital information generation block, the first logger block, the counter block, and the second logger block are selectable from among the general-purpose circuit blocks.

3. The input/output control unit according to claim 2, further comprising:
a third input interface to be connected to a third device and output to the input/output controller a third signal input by the third device, wherein
the trigger outputter comprises a trigger block to output the third signal as the trigger signal.

4. The input/output control unit according to claim 2, wherein the trigger outputter further comprises
a counter block to function as a ring counter, and
a comparison operation block to output the trigger signal every time a count value indicated by the count information output by the counter block matches a preset count threshold for the count value.

5. The input/output control unit according to claim 1, further comprising:
a third input interface to be connected to a third device and output to the input/output controller a third signal input by the third device, wherein
the trigger outputter comprises a trigger block to output the third signal as the trigger signal.

6. The input/output control unit according to claim 1, wherein the trigger outputter further comprises
a counter block to function as a ring counter, and
a comparison operation block to output the trigger signal every time the count value indicated by count information output by the counter block matches a preset count threshold for the count value.

7. The input/output control unit according to claim 1, wherein
the first storage areas are specified by consecutive physical addresses, and the second storage areas are specified by consecutive physical addresses, and
a first relative address represented by a value of difference between the physical address of a value of difference between a physical address of the first storage area in which the first information is included and a start physical address of the first storage areas is equal to a second relative address represented by a value of difference between a physical address of the second storage area in which the second information associated with the first information is stored and a start physical address of the second storage areas.

8. The input/output control unit according to claim 1, further comprising:
a determination criterion information storage to store, in association with the second information associated with the first information, determination criterion information that indicates a preset determination criterion with respect to a numerical value indicated by the first information; and
a determiner to obtain the first information from the first storage areas and the second information from the second storage areas, and determine, based on the determination criterion information, whether a numerical value indicated by the obtained first information satisfies the determination criterion.

9. The input/output control unit according to claim 1, further comprising:
a third input interface to be connected to a third device and output to the input/output controller a third signal input by the third device, wherein
the trigger outputter comprises a trigger block to output the third signal as the trigger signal.

10. The input/output control unit according to claim 1, wherein the trigger outputter further comprises
a counter block to function as a ring counter, and
a comparison operation block to output the trigger signal every time a count value indicated by the count information output by the counter block matches a preset count threshold for the count value.

11. A programmable logic controller comprising:
an input/output control unit comprising a storage, an input/output controller, a first input interface to be connected to a first device and output to the input/output controller a first signal input by the first device, and a second input interface to be connected to a second device and output to the input/output controller a second signal input by the second device, and
a CPU unit capable of accessing the storage,
the input/output controller comprising
a trigger outputter to generate a trigger signal,
a first logger block to store, in synchronization with the trigger signal, first information in preset first storage areas in the storage, the first information being based on the first signal, and
a second logger block to store, in synchronization with the trigger signal, second information, in association with the first information, in preset second storage areas in the storage, the second information being based on the second signal, wherein
the CPU unit comprises a determiner to obtain the first information from the first storage areas and the second information from the second storage areas of the storage, and determine, based on determination criterion information that indicates a preset determination criterion with respect to a numerical value indicated by the first information, whether a numerical value indicated by the obtained first information satisfies the determination criterion.

12. The programmable logic controller according to claim 11, wherein after pieces of digital information and pieces of second information that are necessary for determination by the determiner are stored in the first storage areas and the second storage areas, the CPU unit obtains together the pieces of first information from the first storage areas and the pieces of second information from the second storage areas.

13. An inspection system comprising:
a first device;
a second device; and
a programmable logic controller comprising
an input/output control unit comprising a storage, an input/output controller, a first input interface to be connected to a first device and output to the input/output controller a first signal input by the first device, and a second input interface to be connected to a second device and output to the input/output controller a second signal input by the second device, and
a CPU unit capable of accessing the storage,
the input/output controller comprising
a trigger outputter to generate a trigger signal,
a first logger block to store, in synchronization with the trigger signal, first information in preset first storage areas in the storage, the first information being based on the first signal, and
a second logger block to store, in synchronization with the trigger signal, second information, in association with the first information, in preset second storage areas in the storage, the second information being based on the second signal, wherein
the input/output control unit further comprises
a determination criterion information storage to store, in association with the second information associated with the first information, determination criterion information that indicates a preset determination criterion with respect to a numerical value indicated by the first information; and
a determiner to obtain the first information from the first storage areas and the second information from the second storage areas, and determine, based on the determination criterion information, whether a numerical value indicated by the obtained first information satisfies the determination criterion.

14. The inspection system according to claim 13, wherein
the first device is a laser displacement sensor,
the second device is an encoder,
the first signal is a signal representing a thickness of a wafer,
the second signal is a signal representing an angle of rotation of the wafer,
the first logger block, in synchronization with the trigger signal, stores the first information representing the thickness of the wafer in preset first storage areas in the storage, the first information being based on the first signal,
the second logger block, in synchronization with the trigger signal, stores the second information representing the angle of rotation of the wafer, in association with the first information, in preset second storage areas in the storage, the second information being based on the second signal, the determination criterion information storage stores, in association with the second information representing the angle of rotation of the wafer associated with the first information, determination criterion information that indicates a preset determination criterion with respect to a numerical value representing the thickness of the wafer indicated by the first information, and the determiner obtains the first information from the first storage areas and the second information from the second storage areas, and determines, based on the determination criterion information, whether a numerical value representing the thickness of the wafer indicated by the obtained first information satisfies the determination criterion.

15. The inspection system according to claim 13, further comprising:

a third device, wherein the input/output control unit further comprises a third input interface to be connected to the third device and output to the input/output controller a third signal input by the third device, and the trigger outputter has a trigger block to output the third signal as the trigger signal.

16. The inspection system according to claim 15, wherein the third device is a proximity sensor to detect an approach of a wafer, and the third input interface is connected to the third device and outputs to the input/output controller the third signal that is a trigger signal input by the third device.

* * * * *